United States Patent [19] [11] 4,111,865

Seefried, Jr. et al. [45] Sep. 5, 1978

[54] POLYMER/POLYOLS AND POLYURETHANE FORMS AND ELASTOMERS THEREFROM

[75] Inventors: Carl G. Seefried, Jr.; Robert D. Whitman; Russell Van Cleve, all of Charleston

[73] Assignee: Union Carbide Corporation, New York, N.Y.

[21] Appl. No.: 727,221

[22] Filed: Sep. 27, 1976

Related U.S. Application Data

[63] Continuation of Ser. No. 523,474, Nov. 13, 1974, abandoned.

[51] Int. Cl.[2] ...................... C08G 18/14; C08G 18/63; C09K 3/00; C08K 5/06

[52] U.S. Cl. .................................... 521/137; 252/182; 260/33.2 R; 260/859 R

[58] Field of Search ........ 260/615 B, 2.5 BE, 2.5 AP, 260/33.2 R; 252/182

[56] References Cited

U.S. PATENT DOCUMENTS

| | | | |
|---|---|---|---|
| 1,922,459 | 8/1933 | Schmidt et al. | 260/106 |
| 2,527,970 | 10/1950 | Sokol | 260/615 |
| 2,602,051 | 7/1952 | De Groote | 252/331 |
| 2,673,882 | 3/1954 | Griffin | 260/615 |
| 2,674,619 | 4/1954 | Lundsted | 260/485 |
| 2,927,918 | 3/1960 | Anderson | 260/209 |
| 3,022,335 | 2/1962 | Lyndsted | 260/485 |
| 3,073,788 | 1/1963 | Hostettler et al. | 260/2.5 |
| 3,085,085 | 4/1963 | Wismer et al. | 260/209 |
| 3,101,374 | 8/1963 | Patton | 260/584 |
| 3,153,002 | 10/1964 | Wismer et al. | 260/2.5 |
| 3,222,357 | 12/1965 | Wismer et al. | 260/209 |
| 3,336,242 | 8/1967 | Hampson et al. | 260/2.5 AP |
| 3,383,351 | 5/1968 | Stamberger | 260/2.5 AP |
| 3,405,162 | 10/1968 | Kuryla | 260/2.5 AP |
| 3,461,086 | 8/1969 | Mogford et al. | 260/2.5 |
| 3,535,307 | 10/1970 | Moss et al. | 260/209 |
| 3,546,145 | 12/1970 | Granger et al. | 260/2.5 AP |
| 3,655,553 | 4/1972 | De Wald | 252/1 |
| 3,846,347 | 11/1974 | Satterly | 260/2.5 AF |
| 3,869,413 | 3/1975 | Blankenship | 260/2.5 BE |
| 3,880,780 | 4/1975 | Ridenour et al. | 260/2.5 AP |
| 3,917,571 | 11/1975 | Olstowski et al. | 260/33.2 R |
| 3,931,092 | 1/1976 | Ramlow et al. | 260/33.4 R |
| 3,931,450 | 1/1976 | Patton et al. | 428/315 |

FOREIGN PATENT DOCUMENTS

| | | | |
|---|---|---|---|
| 735,010 | 5/1966 | Canada. | |
| 785,835 | 5/1968 | Canada. | |
| 2,263,205 | 7/1974 | Fed. Rep. of Germany. | |
| 45-8,438 | 3/1970 | Japan | 260/2.5 AP |
| 967,441 | 8/1964 | United Kingdom | 260/2.5 AP |
| 1,040,452 | 8/1966 | United Kingdom | 260/2.5 AP |
| 317,770 | 8/1928 | United Kingdom. | |
| 1,415,560 | 11/1975 | United Kingdom. | |

*Primary Examiner*—H.S. Cockeram
*Attorney, Agent, or Firm*—Eugene C. Trautlein

[57] ABSTRACT

This invention relates to novel polymer/polyol compositions consisting essentially of a polyol and a polymer of an unsaturated monomer polymerized in the polyol. The polyols in the novel compositions are polyoxyalkylene-polyoxyethylene polyols having critical oxyalkylene and oxyethylene contents, hydroxyl functionalities, hydroxyl numbers and primary hydroxyl group contents. This invention further relates to novel polyurethanes produced from such polymer/polyol compositions and especially to novel polyurethane foams having outstanding utility as seat cushions having improved static fatigue and humidity sensitivity properties.

13 Claims, 3 Drawing Figures

*Comparison of Rates of Stress Relaxation for Various Molded Polyurethane Foams*

Typical Foam Stress Relaxation Curve at 50% ILD

*Rate of Stress Relaxation Plot for Molded Foam at 50% ILD*

*Comparison of Rates of Stress Relaxation for Various Molded Polyurethane Foams*

POLYMER/POLYOLS AND POLYURETHANE FORMS AND ELASTOMERS THEREFROM

This application is a continuation of our prior U.S. application: Ser. No. 523,474, Filing Date Nov. 13, 1974, now abandoned.

BACKGROUND OF THE INVENTION

Within the past few years, seat cushions fabricated from high-resiliency polyurethane foams have gained increasingly wide acceptance. The polyurethane foams in such cushions are usually made by reacting a polymer/polyol composition and another polyol with organic polyisocyanate in the presence of catalysts, a blowing agent and a silicone surfactant. The polymer/-polyol compositions most widely used in producing such polyurethanes consist essentially of a major amount of a polyol and a minor amount of a polymer. The polyols in these polymer/polyol compositions are typically polyoxypropylenepolyoxyethylene polyols wherein the polyoxyethylene blocks endblock at least 35 mole percent of the polyoxypropylene blocks and are terminated with primary hydroxy groups. These polyols usually have about 85 weight percent polyoxypropylene blocks and about 15 weight percent polyoxyethylene blocks and have hydroxyl numbers of about 34, about 2.6 hydroxyl groups per molecule and about 70 mole percent primary hydroxyl groups. Seat cushions fabricated from polyurethane foams made from formulations containing such polymer/polyol compositions have outstanding properties, particularly excellent load-bearing properties.

Although the above-described polyurethane foams have outstanding properties, there is still some room for improvement in their properties, particularly when intended for use in seat cushions that may be subjected to certain conditions. By way of illustration, seat cushions fabricated from such polyurethane foams tend to exhibit a phenomenon known as "static fatigue". Thus, when an individual is seated on the cushion for a prolonged period of time, the cushion tends to become deformed and to retain the deformation to some extent after the load imposed by the individual is removed. As a further illustration, seat cushions fabricated from such polyurethane foams tend to lose their desirable load-bearing properties to some extent when exposed to conditions of high humidity for prolonged periods of time.

OBJECTS

It is an object of this invention to provide improved polymer/polyol compositions.

It is a further object of this invention to provide polymer/polyol compositions convertible to polyurethanes having improved properties.

It is a still further object of this invention to provide polymer/polyol compositions convertible to polyurethane foams that are less susceptible to static fatigue.

It is another object of this invention to provide polymer/polyol compositions convertible to polyurethane foams having improved humidity sensitivity properties.

It is still another object of this invention to provide improved polyurethanes.

Other objects of this invention will be apparent from the description thereof appearing below.

SUMMARY OF THE INVENTION

This invention provides novel polymer/polyol compositions consisting essentially of:

A. A major amount of a normally liquid polyoxyalkylenepolyoxyethylene polyol consisting essentially of: (1) polyoxyalkylene blocks that consist of oxyalkylene groups containing at least 3 carbon atoms, (2) polyoxyethylene blocks that consist of oxyethylene groups, that endblock at least 35 mole percent of such polyoxyalkylene blocks and that are terminated with primary hydroxyl groups and (3) the residue of at least one starter, said polyol having: (a) from 90 to 97 (preferably 93 to 97) weight percent of such polyoxyalkylene blocks and from 10 to 3 (preferably 7 to 3) weight percent of such polyoxyethylene blocks based on the total weight of such blocks in the polyol, (b) an average of at least 3.2 (preferably at least 3.4) hydroxyl groups per molecule, (c) a hydroxyl number no greater than 45 and (d) at least 35 (preferably at least 50) mole percent primary hydroxyl groups based on the total moles of hydroxyl groups in the polyol; and B. A minor amount of a polymer formed by polymerizing at least one ethylenically unsaturated monomer in said polyol by free radical polymerization, said polymer being in the form of particles that are stably dispersed in the polyol.

This invention further provides elastomeric polyurethanes produced by reacting: (I) a novel polymer/-polyol composition as described above and (II) an organic polyisdocyanate in the presence of (III) a catalyst for the reaction of (I) and (II) to produce the polyurethane.

DESCRIPTION OF PREFERRED EMBODIMENTS

Figure 1:
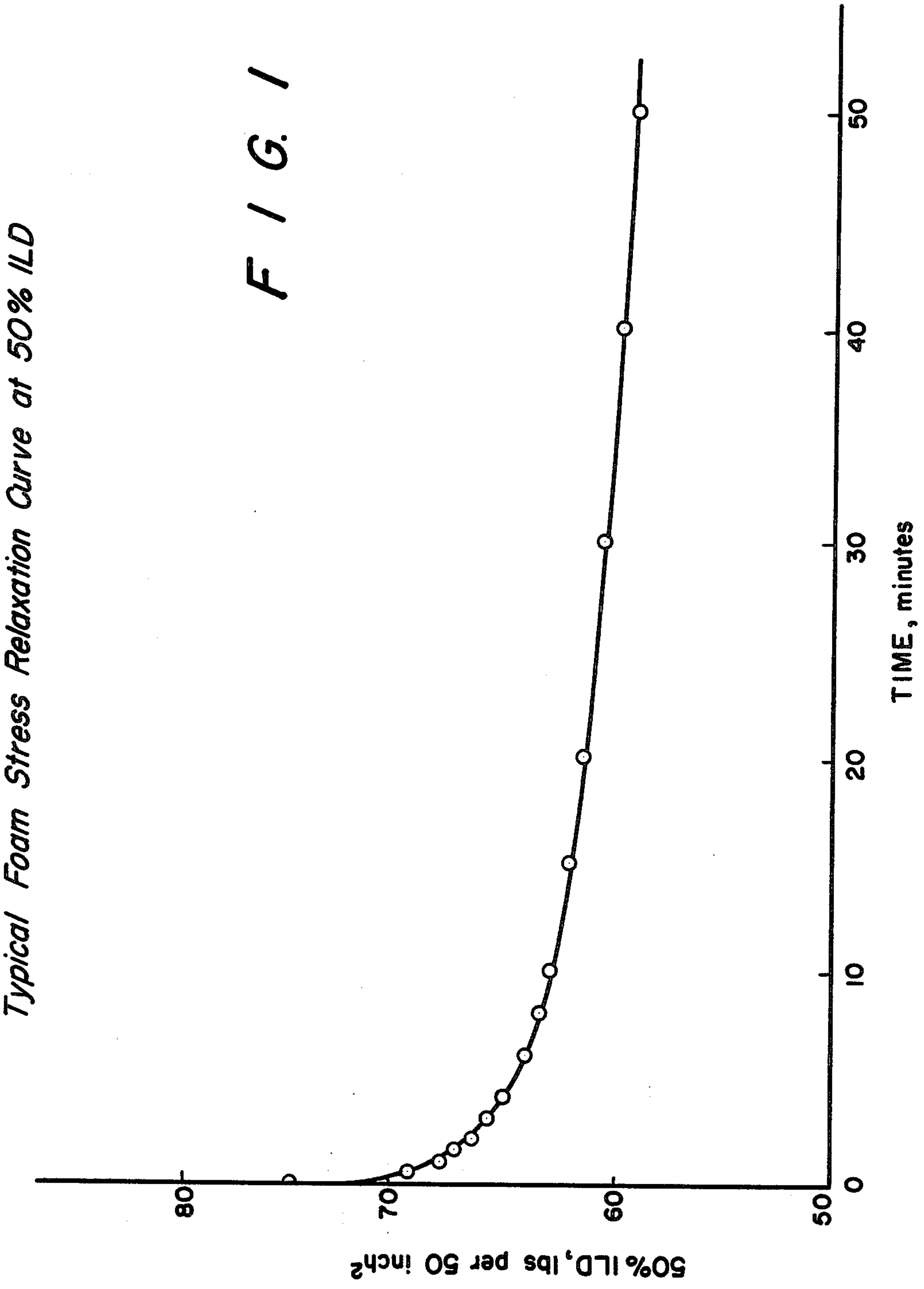
FIG. 1 shows a plot of the 50 percent Indentation Load Deflection (ILD) of a high resiliency polyurethane foam versus time.

The polyols employed in producing the polymer/-polyol compositions of this invention contain from 90 to 97 weight percent polyoxyalkylene blocks and from 10 to 3 weight percent of polyoxyethylene blocks. The polyoxyalkylene blocks consist of oxyalkylene groups containing at least 3 carbon atoms (e.g., oxypropylene, oxybutylene and/or oxypentylene groups). The polyoxyethylene blocks endblock at least 35 mole percent of the polyoxyalkylene blocks and are terminated with the primary hydroxyl groups. Polyols with smaller than this minimum amount of such polyoxyethylene blocks are difficult to convert to polyurethane foams using formulations conventionally employed to produce high resiliency polyurethane foams, apparently because such polyols contain an insufficiency of primary hydroxyl groups. Terminal oxyethylene groups provide essentially only primary hydroxyl groups whereas terminal oxypropylene groups provide secondary and primary hydroxyl groups in a ratio of about 97 to 3. Apparently an insufficiency of primary hydroxyl groups, due to an insufficiency of terminal oxyethylene groups, results in a polyol of insufficient reactivity to permit adequate viscosity buildup in the polyurethane-forming formulation. Consequently, the reaction mixture is of insufficient viscosity to trap the gas used by the blowing agent. On the other hand, polyols having a polyoxyethylene content higher than the maximum polyoxyethylene content of the polyols employed in the present invention tend to result in polyurethane foams whose properties deteriorate to an excessive extent during humid aging.

The polyols employed in producing the polymer/polyol compositions of this invention have an average of at least 3.2 hydroxyl groups per molecule. Polyols having fewer hydroxyl groups tend to have the same disadvantageous properties as polyols having an insufficiency of terminal oxyethylene groups pointed out above (i.e., insufficient reactivity). In this case, the insufficient reactivity is due to the relatively small number of hydroxyl groups. Moreover, polyols having fewer than 3.2 hydroxyl groups per molecule tend to result in polyurethane foams which suffer from static fatigue to an undesirable degree. More preferably, the polyols employed in this invention contain an average from 3.8 to 4.8 hydroxyl groups per molecule.

The polyols employed in the present invention are produced by reacting a starter or mixture of starters with propylene oxide to form a polyol intermediate and then reacting ("capping") the polyol intermediate with ethylene oxide. Preferably, a basic material such as potassium or potassium hydroxide is employed as a catalyst in the reactions.

The minimum average number of hydroxyl groups per molecule in the polyols employed in this invention is achieved by control of the functionality of the starter or mixture of starters used in producing the polyol. Illustrative of suitable starters are organic compounds having at least 4 active hydrogen atoms and up to 20 carbon atoms such as polyhydric alcohols (e.g., erythritol, sorbitol, sucrose, pentaerythritol and methylglycoside) and primary and secondary amines (e.g., ethylene diamine and diethylene triamine). Water is a starter for polyols produced from alkylene oxides and may be present as an impurity in the above-mentioned starters. Moreover, when potassium hydroxide is used as a catalyst in the production of the polyol, it reacts with the starter to produce an alkoxide and water. Water reacts with alkylene oxide to produce polyoxyalkylene diols. Moreover, propylene oxide can isomerize to form allyl alcohol which is a starter and results in the formation of mono-ols. Such mono-ols and diols lower the average functionality of the final polyol product and so the presence of starters leading to mono-ol and diols must be taken into account in order to produce a polyol of the desired average number of hydroxyl groups ("functionality").

The polyols employed in the present invention have hydroxyl numbers no greater than 45. Polyols having hydroxyl numbers above 45 are undesirable because no improvement is noted in the static fatigue and humidity sensitivity of polyurethane foams made from polymer/polyol compositions derived from such polyols.

As noted above, the polyols employed in the present invention are produced by reacting a starter with propylene oxide to form a polyol intermediate and then reacting ("capping") the polyol intermediate with ethylene oxide. Due to the volume limitations of the reactor employed, it may be necessary to produce the polyol intermediate in a series of steps in order to produce a final polyol intermediate of the desired relatively low hydroxyl number (i.e., relatively high combining weight). In order to insure that a relatively high proportion of the endblocking groups in the final polyol product are primary hydroxyl groups, it is desirable to heat the polyol intermediate at reduced pressure so as to volatilize any unreacted propylene oxide. As noted above, the propylene oxide tends to produce almost exclusively secondary hydroxyl groups and hence at most only a small amount of propylene oxide should be present during the final step in the production of the polyol. After the polyol intermediate has been capped with ethylene oxide to produce the final polyol product, magnesium silicate can be added and the product filtered so as to remove potassium catalyst.

The polymer/polyol compositions of the present invention are produced by polymerizing a minor amount of at least one ethylenically unsaturated monomer in a major amount of the above-described polyols by free radical polymerization.

Ethylenically unsaturated monomers suitable for ude in producing the polymer/polyol compositions of the present invention include the hydrocarbon monomers such as butadiene, isoprene, 1,4-pentadiene, 1,6-hexadiene, 1,7-octadiene, styrene, alpha-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dischlorostyrene, bromostyrene, fluorostyrene, trifluoromethylstyrene, iodostyrene, cyanostyrene, nitrostyrene, N,N-dimethylaminostyrene, acetoxystyrene, methyl 4-vinylbenzoate, phenoxystyrene, p-vinyl diphenyl fulfide, p-vinylphenyl phenyl oxide, and the like; and acrylic and substituted acrylic monomers such as acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl alpha-chloroacrylate, ethyl alpha-ethoxyacrylate, methyl alpha-acetaminoacrylate, butyl acrylate, 2-ethylhexyl acrylate, phenyl acrylate, phenyl methacrylate, methacrylonitrile, acrylonitrile, N,N-dimethylacrylamide, N,N-dibenzylacrylamide, N-butylacrylamide, methacrylyl formamide, and the like; the vinyl esters, vinyl ethers, vinyl ketones, etc. such as vinyl acetate, vinyl chloroacetate, vinyl alcohol, vinyl butyrate, isopropenyl acetate, vinyl formate, vinyl acrylate, vinyl methacrylate, vinyl methoxy acetate, vinyl benzoate, vinyl iodide, vinyl toluene, vinyl naphthalene, vinyl bromide, vinyl fluoride, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, dichlorobutadiene, vinyl pyridine, and the like. Mixtures of such monomers can be used.

Preferably a mixture of from 40 to 85 weight percent acrylonitrile and from 60 to 15 weight percent styrene, based on the weight of the acrylonitrile and styrene, is polymerized in the polyol to produce the polymer.

The free radical polymerization catalyst that can be employed in producing the polymer/polyols of this invention include peroxides, persulfates, perborates, percarbonates, azo compounds, etc. including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-alpha-cumyl peroxide, dipropyl peroxide, diisopropyl peroxide, isopropyl-t-butyl peroxide, butyl-t-butyl peroxide, dilauroyl peroxide, difuroyl peroxide, ditriphenylmethyl peroxide, bis(p-methoxybenzoyl)peroxide, p-monomethoxybenzoyl peroxide, rubrene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, alpha-methylbenzyl hydroperoxide, alpha-methyl-alpha-ethyl benzyl hydroperoxide, Tetralin hydroperoxide, triphenylmethyl hydroperoxide, diphenylmethyl hydroperoxide, alpha,alpha'-azo-2-methyl butyronitrile, alpha,alpha'-2-methyl heptonitrile, 1,1'-azo-1-cyclohexane carbonitrile, dimethyl alpha,alpha'-azo-isobutyronitrile, persuccinic acid, diisopropyl peroxy dicarbonate, and the like; a mixture of catalysts may also be used.

The polymer/polyol compositions of this invention consist essentially of a major amount of the polyol and a minor amount of the polymer preferably the compositions consist essentially of from 3 to 35 weight percent of the polymer and from 97 to 65 weight percent of the polyol based on the weight of the polyol and the polymer.

The process used in producing the polymer/polyol compositions of this invention involves polymerizing the monomers in the polyol while maintaining a low monomer to polyol ratio throughout the reaction mixture during the polymerization. Such low ratios are achieved by employing process conditions that provide rapid conversion of monomer to polymer. In practice, a low monomer to polyol ratio is maintained, in the case of semi-batch and continuous operation, by control of the temperature and mixing conditions and, in the case of semi-batch operation, also by slowly adding the monomers to the polyol. The temperature employed is any temperature at which the half life of the catalyst is no longer than six minutes. The mixing conditions employed are those attained using a back-mixed reactor (e.g., a stirred flask or stirred autoclave). Such reactors keep the reaction mixture relatively homogeneous and so prevent localized high monomer to polyol ratios such as occur in certain tubular reactors (e.g., in the first stages of "Marco" reactors when such reactors are operated conventionally with all the monomer added to the first stage). However, tubular reactors (e.g., Marco reactors) can be employed if modified so that increments of the monomer are added to various stages.

When using a semi-batch process, the feed times can be varied (as well as the proportion of polyol in the reactor at the start versus polyol fed with the monomer) to effect changes in the product viscosity. Generally, longer feed times result in higher product viscosities and may allow use of slightly broader acrylonitrile to styrene ranges for a given polyol and polymer content.

The crude polymer/polyol compositions usually contain small amounts of unreacted monomers. Such residual monomers can be converted to additional polymer by employing a two-stage operation in which the product of the first stage (the back-mixed reactor) is passed into a second stage which can be a Marco reactor operated conventionally or an unstirred tank reactor.

The temperature used in producing polymer/polyol compositions in accordance with this invention is any temperature at which the half life of the catalyst is no longer than six minutes (preferably no longer than from 1.5 to 2 minutes). The half lives of the catalysts become shorter as the temperature is raised. The maximum temperature used is not narrowly critical but should be lower than the temperature at which significant decomposition of the reactants or product occurs. By way of illustrations, azo-bisisobutyronitrile has a half life of six minutes at 100° C.

In the process used to produce the polymer/polyols of this invention, the monomers are polymerized in the polyol. Usually, the monomers are soluble in the polyol. It has been found that first dissolving the monomers in a minor portion of the polyol and adding the solution so formed to the remainder of the polyol at reaction temperature facilitates mixing the monomers and the polyol and can reduce or eliminate reactor fouling. When the monomers are not soluble in the polyols, known techniques (e.g., dissolution of the insoluble monomers in another solvent) can be used to disperse the monomers in the polyol prior to polymerization. The conversion of the monomers to polymers achieved by this process is remarkably high, (e.g., conversions of at least 72% to 95% of the monomers are generally achieved).

The present invention also provides elastomeric polyurethanes produced by reacting: (I) a polymer/polyol composition of this invention as described above and (II) an organic polyisocyanate in the presence of (III) a catalyst for the reaction of (I) and (II) to produce the polyurethane. Preferably, the polyurethane is a foam and the reaction to produce the polyurethane is conducted in the presence of (IV) a blowing agent and (V) a silicone surfactant as additional starting materials.

The organic polyisocyanates that are useful in producing the polyurethanes of this invention are organic compounds that contain at least two isocyanato groups. Such compounds are well known in the art of producing polyurethane foams. Suitable organic polyisocyanates include the hydrocarbon diisocyanates, (e.g., the alkylene diisocyanates and the arylene diisocyanates) as well as known triisocyanates and polymethylene poly(phenylene isocyanates). As examples of suitable polyisocyanates are 1,2-diisocyanatoethane, 1,4-diisocyanatobutane, 2,4-diisocyanatotoluene, 2,6-diisocyanato tolylene, 1,3-diisocyanato-o-xylene, 1,3-diisocyanato-m-xylene, 1,3-diisocyanato-p-xylene, 2,4-diisocyanato-1-chlorobenzene, 2,4-diisocyanato-1-nitrobenzene, 2,5-diisocyanato-1-nitrobenzene, 4,4'-diphenylmethylene diisocyanate; 3,3'-diphenylmethylene diisocyanate; and polymethylene poly(phenyleneisocyanates) having the formula:

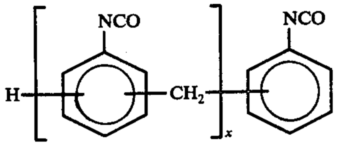

wherein $x$ has an average value from 1.1 to 5 inclusive (preferably from 1.3 to 2.0). Usually a slight excess of the organic polyisocyanate is employed.

The catalysts that are useful in producing the polyurethanes of this invention include tertiary amines such as bis(dimethylamino ethyl) ether, triethylene diamine, trimethylamine, triethylamine, N-methylmorpholine, N-ethylmorpholine, N,N-dimethylethanolamine, N,N,N',N'-tetramethyl-1,3-butanediamine, triethanolamine, 1,4-diazabicyclo[2.2.2]octane, pyridine oxide and the like. Such amine catalysts are preferably employed dissolved in a suitable solvent (e.g., dipropylene glycol). Suitable catalysts also include organotin compounds such as dialkyltin salts of carboxylic acids, e.g., dibutyltin diacetate, dibutyltin dilaurate, dibutyltin maleate, dilauryltin diacetate, dioctyltin diacetate, and the like. The catalysts are employed in small amounts, for example, from about 0.001 per cent to about 5 per cent based on weight of the reaction mixture.

The blowing agents useful in producing the polyurethane foams of this invention include water and halogenated hydrocarbons such as trichlorofluoromethane, dichlorodifluoromethane, dichloromonofluoromethane, dichloromethane, trichloromethane, 1,1-dichloro-1-fluoroethane, 1,1,2-trichloro-1,2,2-trifluoroethane, hexafluorocyclobutane, octafluorocyclobutane, and the like. Another class of blowing agents include thermally-unstable compounds which liberate gases upon heating, such as N,N'-dimethyl-N,N'-dinitrosoterephthalamide, and the like. The generally preferred method of foaming is the use of water or a combination of water plus a fluorocarbon blowing agent such as trichloromonofluoromethane. The quantity of blowing agent employed will vary with factors such as the density desired in the foamed product.

The silicone surfactants useful in producing the polyurethane foams of this invention include siloxane-oxyalkylene block copolymers, such as those disclosed in U.S. Pat. No. 3,741,917, cyanoalkyl modified siloxane fluids such as those disclosed in Belgian Pat. No. 809,978 and cyanoalkoxy-alkyl siloxane fluids such as those disclosed in Belgian Pat. No. 809,979. Such surfactants are used in amounts of from 0.03 to 2 parts by weight per 100 parts by weight of the polymer/polyol and any other polyol used and are usually employed dissolved in a liquid oxyalkylene polymer. Also useful are low molecular weight silicone oils [$Me_3SiO(Me_2SiO)_xSiMe_3$] having viscosities of 3 to 7 centistokes at 25° C. However, silicone oils, as contrasted to the other surfactants mentioned above, are only useful within a narrow range of process conditions as disclosed in the patents mentioned above.

Preferably, additional amounts of the polyols employed to produce the polymer/polyol compositions of the present invention are used along with those compositions in producing the polyurethanes of this invention. Additionally, conventional polyols can be employed along with the novel polymer/polyol compositions in producing the polyurethanes.

The polyols employed in producing the polymer/polyol compositions of this invention are also novel materials that represent a further aspect of this invention. Elastomeric polyurethanes derived from these novel polyols (using the same polyurethane-forming procedure and other starting materials described above in connection with the novel polymer/polyol compositions) represent a still further aspect of this invention.

The elastomeric polyurethanes of this invention can be produced by any suitable method. Thus, the foams can be molded or free rise and can be produced by the prepolymer, quasi-prepolymer or one-shot processes.

The polyurethanes of this invention can be employed as automobile seat cushions, crash pads, arm rests, mattresses and automobile bumpers. The improved static fatigue and humid aging properties of the polyurethanes of this invention make them particularly useful in such applications, and in other applications (e.g., furniture cushions).

The following Examples illustrate the present invention:

DEFINITIONS

As used in the Examples appearing below, the following symbols, terms and abbreviations have the indicated meanings:

"%" denotes percent by weight unless otherwise stated.
"A/S" or "A:S" denotes the weight ratio of acrylonitrile to styrene.
"Calc." denotes calculated.
"cks." denotes viscosity in centistokes at 25° C.
"cps." denotes viscosity in centipoises measured at 25° C.
"Cookout" denotes the period a reaction mixture is heated after all starting materials have been added.
"Ft." denotes foot.
"Functionality" denotes the average number of reactive groups in a molecule.
"gm" denotes grams.
"hr" denotes hour.
"Index" denotes the relative amount of isocyanato groups and active hydrogen atoms in a polyurethane-forming formulation and is calculated as follows:

$$\text{Index} = \frac{\text{Equivalents of NCO}}{\text{Equivalents of active hydrogen}} \times 100$$

"Ionol" denotes 2,6-di-tert-butyl-4-methylphenol.
"lbs" denotes pounds.
"meq/gms" denotes milli-equivalents per gram.
"max." denotes maximum.
"min." denotes minutes.
"mg" denotes milligrams.
"mm Hg" denotes millimeters of mercury absolute pressure.
"Parts" and "pbw" denotes parts by weight.
"pcf" denotes pounds per cubic foot.
"Poly A" denotes polyacrylonitrile.
"Poly S" denotes polystyrene.
"ppm" denotes parts by weight per million parts by weight.
"psig" denotes pounds per square inch gauge pressure.
"pli" denotes pounds per linear inch.
"Residuals" denotes unreacted monomers.
"RPM" denotes revolutions per minute.

"Stripped" denotes removal of volatile materials by heating at reduced pressure.

"Wt" denotes weight.

PREPARATION PROCEDURES

The polyols, polymer/polyols and polyurethane foams described in the Examples appearing below were prepared by the following procedures:

A. Polyol Preparation

Due primarily to the limitations imposed by the volume of the reactors used, the desired relatively low hydroxyl numbers (correspond to relatively high combining weights) of the polyols of the Examples appearing below could not be achieved by a one-step procedure. Hence, the polyols were produced by the following five-step procedure. In Step 1, a starter (e.g. erythritol) which usually had been stripped to remove any water, was mixed with KOH containing some absorbed water. The mixture so formed was heated and the starter and KOH reacted to produce an alkoxide and water. In Step 2, the product of Step 1 was reacted with propylene oxide to produce a first polyol intermediate. In Step 3, the first polyol intermediate was mixed with additional KOH and reacted with additional propylene oxide to produce a second polyol intermediate and this intermediate was mixed with KOH to serve as a catalyst in subsequent steps. In Step 4, the product of Step 3 was reacted with propylene oxide to produce a third polyol intermediate. Unreacted propylene oxide was then stripped from this intermediate. In Step 5, the stripped third polyol intermediate was reacted with ethylene oxide to produce the final polyol product. After each addition of KOH, the reaction mixture was stirred with heating for a prolonged period to ensure adequate dispersion of the KOH in the starter or intermediate and to promote alkoxide formation. Further, for the polyols of narrow functionality distribution, the water absorbed by KOH and produced during alkoxide formation was stripped after each addition of KOH. After each addition of alkylene oxide, the reaction mixture was heated for a prolonged period ("cooked out") to maximize reaction of the alkylene oxide.

The following detailed procedure (used in Example 1) illustrates the above-described general procedure.

Step 1 - Molten, anhydrous erythritol (1000 grams) was charged to a two-liter glass flask equipped with a stirrer. Flake KOH containing about 10% water (4.0 grams) were added to the flask. The mixture so formed was stripped for one hour at 150° C. and <5 mm. Hg with stirring.

Step 2 - The product of Step 1 was added to a 1.5 gallon stainless steel autoclave equipped with a stirrer. The contents of the autoclave were maintained at temperature of about 140° C and propylene oxide fed until the reaction product had a hydroxyl number of 442. KOH was removed by diluting with an isopropanol-water solution containing about 12% water and mixing with an ion exchange resin. The product was filtered. This ion exchange treatment and filtration was not used in the other Examples. After stripping the isopropanol and water, a first polyol intermediate was obtained having a hydroxyl number of 441, a functionality of 3.91 and a viscosity of 1700 centistokes.

Step 3 - The first intermediate polyol (1267 gms) was catalyzed with 20 gms of flake KOH. The mixture so formed was stripped at 130° to 140° C. and <5 mm Hg for one hour with stirring. Propylene oxide (7178 gms) was reacted with the stripped mixture in a 2.0 gallon stainless steel autoclave equipped with a stirrer over a period of 7.5 hours at 110° C. and 60 psig. Then the mixture was heated at 110° C. for 5 hours to yield 8670 gms of a second intermediate polyol. In order to increase the KOH content to the level desired in the production of the third intermediate polyol, the second intermediate polyol was mixed with 45 grams of additional KOH and heated at 140° C. with stirring for 1 hour at <5 mm Hg.

Step 4 - The second intermediate polyol containing KOH (18.8 pounds) was charged to a 10-gallon stainless steel jacketed autoclave equipped with a stirrer. Propylene oxide (32 pounds) was fed to the autoclave in two increments at 110° C. and 52 psi in 5 hours. The contents of the autoclave were heated at 110° C. for an additional 6 hours to react nearly all the propylene oxide. The contents of the autoclave were then stripped at 120° C. and 6 mm Hg absolute pressure for 3 hours to remove unreacted propylene oxide.

Step 5 — Then 3.9 pounds of ethylene oxide was fed into the autoclave at 110° - 114° C. in 1 hour after which the contents of the autoclave were heated at 110° C. for an additional 1 hour and then was stripped for 1 hour at 16 to 11 mm of Hg. Potassium was removed from the product so obtained by treatment with magnesium silicate ("Brite Sorb") for 17 hours. After the addition of 0.01 pounds of Ionol, the product was filtered, and the filtrate was stripped to remove water. The final polyol product (39.54 pounds) had the following analyses:

| | |
|---|---|
| Hydroxyl number | 28.87 |
| Acid number | 0.01 |
| Water, % | 0.03 |
| Alkalinity, meq/gm | 0.00009 |
| Viscosity, cks at 25° C. | 1294 |
| Primary Hydroxyl, mole % | 70 |
| Average functionality | 3.45 |
| Oxyethylene content, % | 8.09 |
| Unsaturation, meq/gm | 0.076 |

B. Polymer/Polyol Preparation

The following is the general procedure used to produce the polymer/polyol compositions described in the Examples appearing below:

Equipment

A single-stage continuous back-mixed reactor having a volume of 550 cubic centimeters was used. This reactor was agitated with a top-entering radial propeller and contained four equally spaced vertical baffles. The reactor was provided with means for heating and cooling through the side walls. Two feed tanks were used, each on separate scales, and connected by flexible tubes to positive displacement metering pumps. The selected weight ratio of styrene, acrylonitrile and azobisisobutyronitrile was premixed and fed from one tank. The other tank contained the base polyol. The two streams were fed simultaneously, through an in-line mixer prior to entering the bottom of the reactor near the radial propeller. The product was discharged out the top of the reactor through a back-pressure regulator and a cooler that lowered product temperature to about 35° C.

Procedure

Initially the reactor was filled with Polyol I and additional Polyol I was fed for the first half hour of operation. Prior to starting the feeds, the reactor and its contents were heated to 140° C. Both the polyol and the monomer-catalyst mixture (e.g., 80 parts acrylonitrile 20 parts styrene and 1.74 parts azobisisobutyronitrile) feeds were started simultaneously and feed rates adjusted to give the desired ratio to yield a polymer/-polyol composition having about 79% polyol and 21% polymer. The temperature was adjusted to 120° C. After about 0.5 hour of operation, the polyol feed was switched from Polyol I to the desired polyol via parallel feed systems. After making final feed rate adjustments, feeds were continued for 50 minutes before collection of product was begun. The product was stripped at 130° C. and one mm Hg absolute pressure to yield the desired composition. The reaction was begun using Polyol I, rather than the desired polyol, since experience with other polyols has shown that this procedure sometimes minimizes the formation of large granules during start-up.

C. Polyurethane Foam Preparation

Molded Foam - Laboratory Scale

Prepare mold by waxing with "Perma-Mold Release Agent 804–07 SH" and heat to 170° to 200° F in oven. Wipe off excess mold release agent and allow mold to cool to 120° F. Weigh isocyanate into a beaker and measure water and amine catalysts into another beaker. Weigh polyol and tin catalyst and silicone surfactant into a 0.5 gallon carton and place on drill press. With timer set for total of 90 seconds, mix polyol 30 seconds with a 2.5 inch 6-blade turbine at 400 RPM. Stop mixer, remove carton and add water/amine mixture and baffles to carton. Mix 55 seconds and stop mixer. Add isocyanate and continue mixing for 5 seconds. Mixer will stop (end of 90 sec. preset time) and small timer starts. Allow to drain from mixer a few seconds, remove carton and shake several times into a mold (mold dimensions = 15 in. × 15 in. × 4.75 in.) Mold is at 120° F. Place baffles in can for washing and close mold lid. After 2 minutes, place mold in 250° F oven for 6 minutes. (Total 8 min.) Demold foam and crush foam by hand before running thru roller 3 times. Trim foam and weigh. Record exit time, foam weight, tightness, green strength, moldability, etc. and place foam immediately in test laboratory at 50% Relative Humidity to cure before testing.

Free Rise Foam - Laboratory Scale

The same mixing sequence is used as was used for laboratory-scale molded foams described above. The formulation is poured into an open box (dimensions - 14 in. × 14 in. × 6 in.) and allowed to cure without application of heat from an external source.

Molded Foam - Large Scale

An "Admiral" machine (capacity 40 pounds per minute total throughput) is used and is operated in a conventional manner. The machine has a mixing head, metering and dispensing equipment and heat exchangers. The following operating conditions are employed:

| | |
|---|---|
| Mixing Head | Low Pressure-High Shear |
| Mixing Speed, rpm | 4800 |
| Throughput, lbs./min. | 20 |
| Temperature of Starting Materials, ° F. | 75 |
| Mold Type | Cast Aluminum |
| Mold Dimensions | 15 × 15 × 4-½ inches |
| Venting | Four holes (3/16 in. diameter each) at corners of top of mold. |
| Mold Temperature, ° F. | Varied |
| Release Agent | "Perma-Mold Release Agent 804-07SH" |
| Demold Time, min. | 8 |
| Crush | Upon Demold |
| Post-Cure | None |

STARTING MATERIALS

In the Examples appearing below, the following designations are used to denote the indicated starting materials:

A. Polyols

"Polyol I" denotes a commercially available polyol produced by reacting glycerine and propylene oxide and then capping with ethylene oxide. This polyol contains 85% propylene oxide and 15% ethylene oxide and has an average of 2.6 hydroxyl groups per molecule, a primary OH content of about 73 mole-% and a hydroxyl number of 34.

"Polyol II" denotes a commercially available polyol produced by reacting glycerine and propylene oxide and then capping with ethylene oxide. This polyol contains 90% propylene oxide and 10% ethylene oxide and has an average of 2.7 hydroxyl groups per molecule, a primary OH content of about 47 mole-% and a hydroxyl number of 45.

"Polyol III" denotes a commercially available polyol produced by reacting glycerine and propylene oxide. This polyol contains an average of about 2.9 hydroxyl groups per molecule and has about 3 mole-% primary hydroxyl group per molecule and a hydroxyl number of 56.

"Polyol IV" denotes a commercially available polyol produced by reacting glycerine and propylene oxide and then capping with ethylene oxide. This polyol contains 85% propylene oxide and 15% ethylene oxide and has an average of 2.1 hydroxyl groups per molecule, a primary OH content of about 83 mole-% and a hydroxyl number of 27.

B. Polymer/Polyol

"Polymer/Polyol I" denotes a commercially available polymer/polyol composition produced by polymerizing a mixture of acrylonitrile and styrene in Polyol I in the presence of 2,2'-azo-bis-isobutyronitrile. The composition consists of about 79% polyol and about 21% polymer. The polymer consists of about 50% acrylonitrile and about 50% styrene.

C. Catalysts

"VAZO-64" or "VAZO" denotes 2,2'-azo-bis-isobutyronitrile.

"TMSN" is tetramethylsuccinonitrile (a decomposition product of VAZO).

"Amine Catalyst I" denotes a solution consisting of 70% bis(2-dimethylaminoethyl) ether and 30% dipropylene glycol.

"Amine Catalyst II" denotes a solution consisting of 33% triethylene diamine and 67% dipropylene glycol.

"Amine Catalyst III" denotes a catalyst solution consisting of 33% 3-dimethylamino-N,N-dimethylpropionamide and 67% $C_9H_{19}C_6H_4(OC_2H_4)_9OH$.

D. Isocyanates

"TDI" deontes a mixture of 80% 2,4-tolylene diisocyanate and 20% 2,6-tolylene diisocyanate.

"AFPI" denotes a polymethylene poly(-phenyleneisocyanate having the average formula:

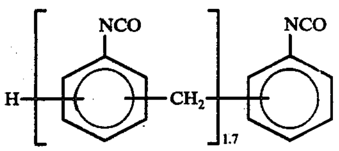

"Isocyanate I" denotes a mixture of 80% TDI and 20% AFPI.

E. Silicone Surfactants

"Silicone J" denotes a solution of a siloxane block copolymer disclosed in U.S. Pat. No. 3,741,917 sold as "Union Carbide L-5303 Silicone Surfactant".

"Silicone II" denotes a silicone oil having the average formula $Me_3SiO(Me_2SiO)_xSiMe_3$ where Me is methyl and where the oil has a viscosity of 5 centistokes at 25° C.

"Silicone III" denotes a solution of a siloxane block copolymer disclosed in U.S. Pat. No. 3,741,917 sold as "Union Carbide Y-6608 Silicone Surfactant".

"Silicone IV" denotes a solution of a siloxane block copolymer disclosed in U.S. Pat. No. 3,741,917 sold as "Union Carbide Y-6531 Silicone Surfacant".

F. Monomers

"VCN" denotes acrylonitrile.

"STY" denotes styrene.

POLYOL PROPERTIES

A. Average Number of Hydroxyl Groups Per Polyol Molecule (Functionality)

(1) Purpose and Limitations. The following procedure was developed to determine the average functionality of polyols used in the manufacture of flexible and rigid polyurethane foams. Samples, reagents and all equipment must be thoroughly dried in order to obtain meaningful results. Foreign substances which contain reactive hydrogen groups will interfere.

(2) Principle A series of formulations are prepared whereby predetermined and varying equivalent ratios of the polyol and a diisocyanate (TDI) are reacted so as to cause gelation to occur in some cases, but not in others. The critical gel ratio, a function of the average functionality of the polyol system, is determined by interpolation between the gel and no-gel sample formulations.

(3) Apparatus (a) Several 40-milliliter glass vials equipped with plastic screw caps and polyethylene liners. The vials are dried in a circulating oven maintained at 110° C for 24 hours and stored in a desiccator.

(b) A 100-microliter "Hamilton" syringe calibrated to 1.0 microliter.

(4) Reagents (a) Dimethylformamide Redistilled, or dried with "Linde Molecular Sieves Type 4A" or "5A", until the water content is less than 0.01 percent. Store in capped bottle over "Molecular Sieve Type 4A".

(b) Tolylenediisocyanate (TDI) Minimum purity, 99.5 percent by weight.

(c) Dry Toluene Nitration grade toluene or equivalent dried over "Linde 4A Molecular Sieve" to 0.005 percent water or less.

(d) Catalyst Solution Dissolve 20 grams of triethylenediamine in 200 ml of dry toluene. Distill off (azeotrope) approximately 150 ml of toluene using a simple side-arm distillation apparatus. Place the remaining solution into a 200-ml volumetric flask and dilute to the mark with dry toluene. This solution should contain less than 0.01 percent water.

(5) Procedure (a) Dry approximately 200 grams of the polyol to be analyzed by stripping on a "Rinco Flash Evaporator" at 110° C and <5 millimeters pressure for 2 hours. The water content should be reduced to less than 0.01 percent.

(b) Weigh the prescribed amount of polyol as determined from the formulas shown below into each of 5 sample vials. For polyols with equivalent weights of 1,000 or greater, a two-place pan balance will suffice. For polyols with equivalent weights appreciably less than 1,000 use a 4-place analytical balance.

$$Gp = \frac{5Ep}{R(87.08) + Ep}$$

where $G_p$ = grams of polyol, R = estimated critical gel ratio, e.g. 0.67 for basic triols, 0.50 for basic tetrols, etc., $$Ep = \text{Equivalent weight of polyol} = \frac{\text{hydroxyl number} \times 1{,}000}{56.1}$$

87.08 = equivalent weight of TDI (c) Add 15 ml of dry dimethyl formamide (DMF) to each vial and swirl gently to affect the complete solution of the polyol.

(d) Using a four-place balance for weighing, add the amount of TDI prescribed by the formula below to one of the vials. This may be done volumetrically when high equivalent weight polyols (>1,000) are involved. The density of TDI is 1.2196 grams/milliliter at 20° C. To the other vials add incrementally and successively greater and lesser amounts of TDI. Usually ±10 milligram increments will be satisfactory. Shake well to affect complete solution.

$$G_T = 5 - Gp$$

Where $G_T$ = grams of TDI, $G_p$ = grams of polyol.

(e) Add 0.5 milliliters of the catalyst solution of paragraph 4(d) to each vial.

(f) The samples are thoroughly mixed and stored in the dark at room temperature for at least 24 hours. After observing the gel/no-gel condition of the formulations, it may become necessary to formulate additional samples in order to obtain an accurate critical gel ratio. The critical gel ratio is determined by interpolation between the gel/no-gel sample formulations.

(6) Calculations

At the critical gel ratio:

$$F_{ave.} = \frac{2}{\frac{G_T}{E_T} / \frac{G_P}{E_p}}$$

where $G_T$ = grams of TDI, $E_T$ = equivalent weight of TDI, (87.08), $G_p$ = grams of polyol, $E_p$ = equivalent weight of polyol.

B. Hydroxyl Number

The hydroxyl number of a polyol is the number of milligrams of potassium hydroxide required for the complete hydrolysis of the fully acylated derivative prepared from one gram of polyol. The hydroxyl number can also be defined by the equation:

$$OH \text{ No.} = \frac{56.1 \times 1000 \times f}{7.w.}$$

where:

OH is the hydroxyl number of the polyol $f$ is the functionality, that is, average number of hydroxyl groups per molecule of polyol m.w. is the molecular weight of the polyol C. Oxyethylene Content Measured by Nuclear Magnetic Resonance ("NMR")

D. Primary Hydroxyl Content

Measured by infra red determination of rate of reaction of polyol with phenyl isocyanate.

POLYURETHANE FOAM TESTS

A. Stress Relaxation

Figure 2:
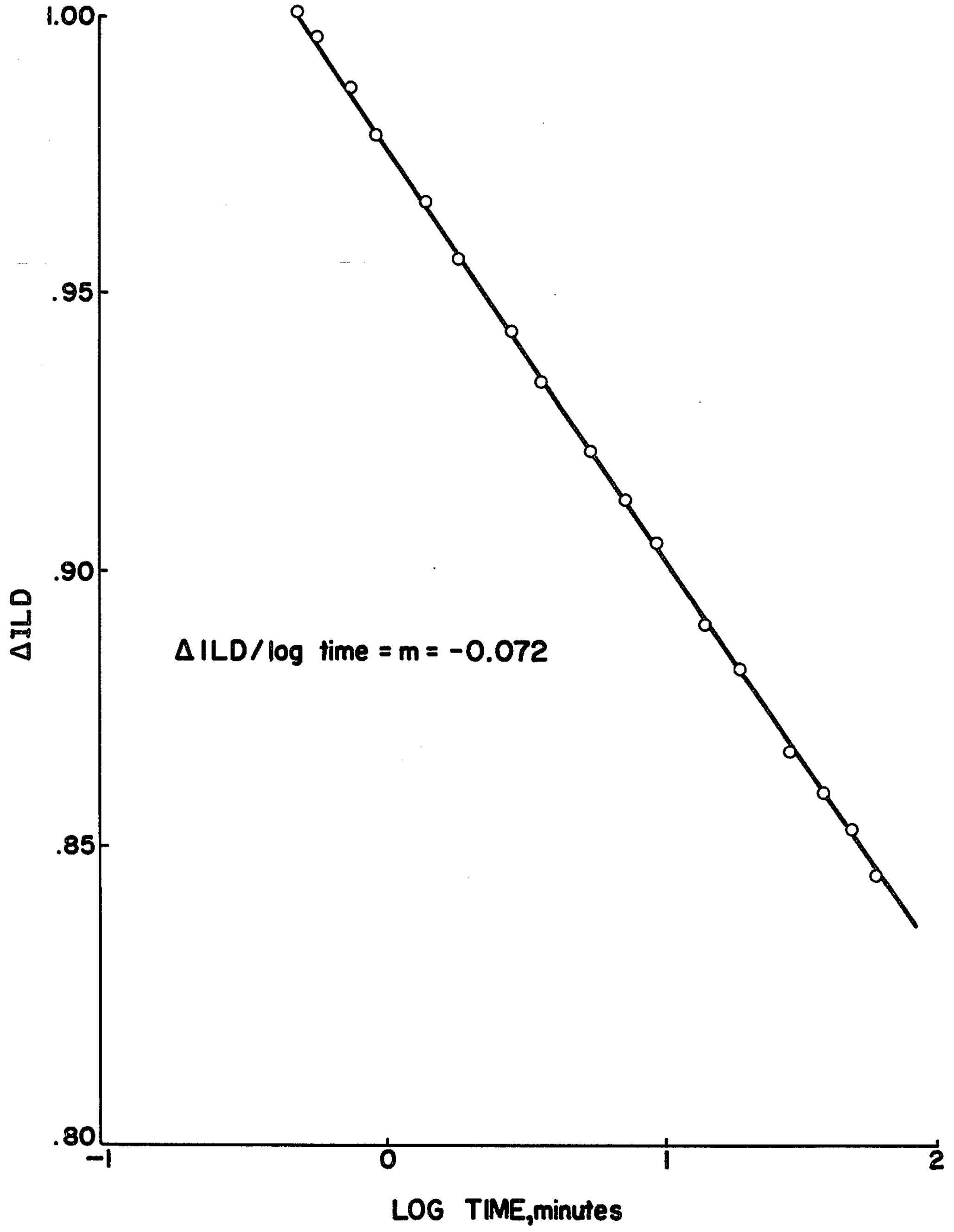
FIG. 2 shows a plot of the fraction of load retained (Δ ILD) by a high resiliency polyurethane foam versus logarithmic time.

The phenomenon of "static fatigue" in a polyurethane foam is related to the stress relaxation properties of the foam. In the Examples appearing below, a measure of the stress relaxation properties of molded, high resiliency foams at ambient temperature is obtained by determining the time dependent rate of load decrease necessary to maintain a 50% indentation load deflection for a one-hour period. A typical plot of the stress or load relaxation of such a foam as a function of time is shown in FIG. I. It is seen that the decrease in load is not a linear function of time, but it appears to be more of an exponential nature. Using the load observed 30 seconds after the 50% indentation deflection has been obtained as a basis for comparison, the fraction of load retained may be calculated for various times. FIG. 2 shows that this quantity of retained load (ΔILD) exhibits a linear relationship with logarithmic time. The negative slope of this plot is taken as a measure of the rate of stress relaxation of the foam sample (this slope is reported as "-ΔILD/log time"). The lower the degree of stress relaxation for a foam, the smaller in magnitude is the slope of this plot and the smaller the tendency of the foam to exhibit "static fatigue".

B. Humid Aging Test

The results of the humid aging testing of molded polyurethane foams described in the Examples appearing below were obtained in accordance with ASTM D 2406. The procedure is as follows:

(a) Age polyurethane foam specimens in steam autoclave for 5 hours at 120° C. and 12 to 16 psig pressure.

(b) Dry specimens 3 hours at 70° C. in a mechanically convected dry-air-oven.

(c) Equilibrate for 16 to 24 hours at 23° C. and 50% Relative Humidity.

(d) Determine:

(i) Percentage compression set after 50% deflection for 22 hours at 70° C (reported as "50% Compression Set, %").

(ii) Percentage loss of compression load at 50% deflection (reported as "Load Loss, %"). The higher the "50% Compression Set, %" and "Load Loss, %" values as determined by this test, the less satisfactory is the foam with respect to humid aging.

The humid aging test results for free rise polyurethane foams were obtained similarly in accordance with ASTM D 1564-69.

C. Mold Exit Time

The "Mold Exit Time" is a measure of the reactivity of a polyurethane-forming formulation. In producing a molded polyurethane in accordance with the Examples appearing below, an isocyanate is mixed with other components of the formulation used to produce the polyurethane at time $T_1$. The formulation is then introduced into the pre-heated mold and expands in the mold. The top of the mold has small vent holes. At time $T_2$ the foam has expanded to the extent that it first begins to come out of the vent holes. The "Mold Exit Time" is the difference between $T_2$ and $T_1$ and is directly proportional to the reactivity of the formulation.

D. Porosity

A polyurethane foam specimen of 0.5 inch in thickness is compressed between two pieces of flanged plastic tubing having a 2.25 inch internal diameter. This assembly is then incorporated as a component in an air flow system. Air at a controlled velocity enters one end of the tubing, flows through the foam specimen and exits through a restriction at the lower end of the assembly. The pressure drop across the foam due to the restriction of air passage is measured by means of an inclined closed manometer. One end of the manometer is connected to the upstream side of the foam and the other end to the downstream side. The flow of air on the upstream side is adjusted to maintain a differential pressure across the specimen of 0.1 inch of water. The air porosity of the foam is reported in units of air flow per unit area of specimen (cubic feet per minute per square foot). The higher the air flow value, the more porous is the foam.

E. Other Test Procedures

In the Examples appearing below, the following properties were measured in accordance with ASTM D1564-69 (in the case of free rise foam) or in accordance with ASTM D2406 (in the case of molded foams):

Indentation Load Deflection ("ILD")
Compression Set
Tensile Strength
Elongation
Tear Resistance
Load Ratio (Sac Factor)
Resilience
Compression Load Deflections ("CLD")
% Return

POLYMER/POLYOL TESTS

A. Filterability

The particle size of the polymer in a polymer/polyol composition is measured by this test. The composition being tested is passed successively through a 150-mesh screen and a 700-mesh screen in the following manner. The screens are cleaned, dried and weighed before the test. A 470 gram sample of the composition being tested is diluted with 940 grams of isopropanol to reduce viscosity effects. The diluted sample is passed through a 2.4 square inch section of the 150 mesh screen and then through a 2.4 square inch section of the 700 mesh screen. Then the screens are washed with isopropanol to remove any polyol, dried and weighed. The difference between the final and initial screen weights corresponds to the amount of polymer that did not pass through the screens. This amount is reported as parts of polymer per million parts of the original (undiluted) sample of the composition. The 150-mesh screen has a square mesh with average mesh opening of 105 microns and it is a "Standard Tyler" 150 square mesh screen. The 700-mesh screen is made with a Dutch twill weave having average mesh openings of 30 microns and is described in Bulletin 46267-R of the Ronningen-Petter Company of Kalamazoo, Michigan.

B. Centrifugable Solids

The stability of a polymer/polyol composition is measured by this test. The composition is centrifuged for about 24 hours at about 3000 revolutions per minute and 1470 radial centrifugal "g" force. Then the centrifuge tube is inverted and allowed to drain for four hours. The non-flowing cake remaining at the bottom of the tube is reported as a percent of the initial weight of the composition tested. The larger this percent is, the less stable is the composition.

C. Hydroxyl Number (i) Measured: This is the value obtained experimentally as disclosed above under Polyol Properties.

(ii) Calculated: This is the value obtained from the equation:

$$\text{OH No} = (\text{OH No})_p \times [1 - (\text{WF})_p]$$

where:

OH No is the hydroxyl number of the polymer/-polyol.

$(\text{OH No})_p$ is the hydroxyl number of the polyol used to make the polymer/polyol (measured value).

$(\text{WF})_p$ is the weight fraction of the polymer in the polymer/polyol.

D. Light Transmission

The polymer/polyol composition is diluted with Polyol III to form a solution containing 0.01% polymer. the % light (wavelength 500 millimicrons) transmitted by this solution is measured.

E. Polymer Contents by Calculation

Polymer content calculations were based on reactor feed rates and residual monomer contents.

EXAMPLES 1 TO 8

Examples 1 to 8 illustrate the effects of functionality (i.e., average number of hydroxyl groups per molecule) and functionality distribution of polyols having hydroxyl numbers of 28 and 45. Functionality distribution was varied depending on whether or not the reaction mixture was stripped to remove water after each addition of KOH. The stripped reaction mixtures (Examples 1 to 4) produced polyols that were relatively free of diol and so had relatively "narrow" distribution of functionality. Those Examples in which the reaction mixtures were not stripped to remove water (Examples 5 to 8) contained significant amounts of diol (due to the reaction of the water with propylene oxide) and so the final polyol products had "broad" distribution of functionality. The starters were chosen so that the final polyol products would have functionalities of about 3 to 4 and hydroxyl numbers of about 28 to 45.

The polyols contained 7 percent oxyethylene groups. The experimental details relating to the preparation of the polyols of Examples 1 to 8 and their intermediates are tabulated in Tables I and II. The properties of the polyols are tabulated in Table III.

Portions of the polyols of Examples 1 to 8 were converted to polymer/polyols containing 79% polyol and 21% polymer having about 80% acrylonitrile and 20% styrene. The experimental details relating to the preparation of these polymer/polyols are tabulated in Table IV. The properties of the polymer/polyols are tabulated in Table V.

The properties of the polyols and polymer/polyols of Examples 1 to 8 are summarized in Table VI.

Molded, high resiliency flexible foams were prepared with each respective pair of polymer/polyols and polyols using the laboratory-scale procedure described above. The molding conditions for these foams were as described above. Catalyst levels were chosen to produce formulations having reactivities characteristic of typical formulations used to make prior art commercial high resiliency foam. The physical properties of the foams prepared with these polyol-polymer/polyol combinations are given in Table VII and are compared with high resiliency foams based on prior art commercial Polyol I-Polymer/Polyol I combination and Polyol IV-Polymer/Polyol I combination. The amount of water in the formulation and the amount of formulations in the mold were designed to give a nominal overall foam density of 3.0 pcf.

The general effects of the polyol molecular structure variations, i.e., hydroxyl number (equivalent weight), average functionality and functionality distribution, on the physical properties of molded high resiliency foams may be summarized as follows:

(a) Resiliency properties (as measured by percent ball rebound) are excellent and comparable to foams prepared with the current commercial polyol-polymer/-polyol combination (polyol I and Polymer/Polyol I).

(b) Indentation load deflection values tend to increase independently with polyol hydroxyl number and average functionality. High resiliency foams prepared with polyols of 29 hydroxyl number and an average functionality of about 3.5 exhibit load bearing properties comparable to the control foam based on the prior art Polyol I-Polymer/Polyol I conbination. The 25% return values and load ratios are similar and comparable to the control foam based on the prior art Polyol I - Polymer/-Polyol I combination.

(c) Tensile strength, elongation and tear resistance properties tend to decrease as the hydroxyl number and average functionality of the polyol increases. These properties generally appear to be improved for polyols with the narrow distribution of molecular functionality to some extent.

(d) Compression set values improve as the hydroxyl number and average functionality of the polyol increases.

(e) Humid aged compression set values improve as the average functionality of the polyol increases. Humid aged load loss properties tend to improve as the average functionality of the polyol increases and exhibit a substantial improvement as the polyol hydroxyl number decreases. This occurs without an adverse effect on the humid aged compression set properties.

Figure 3:
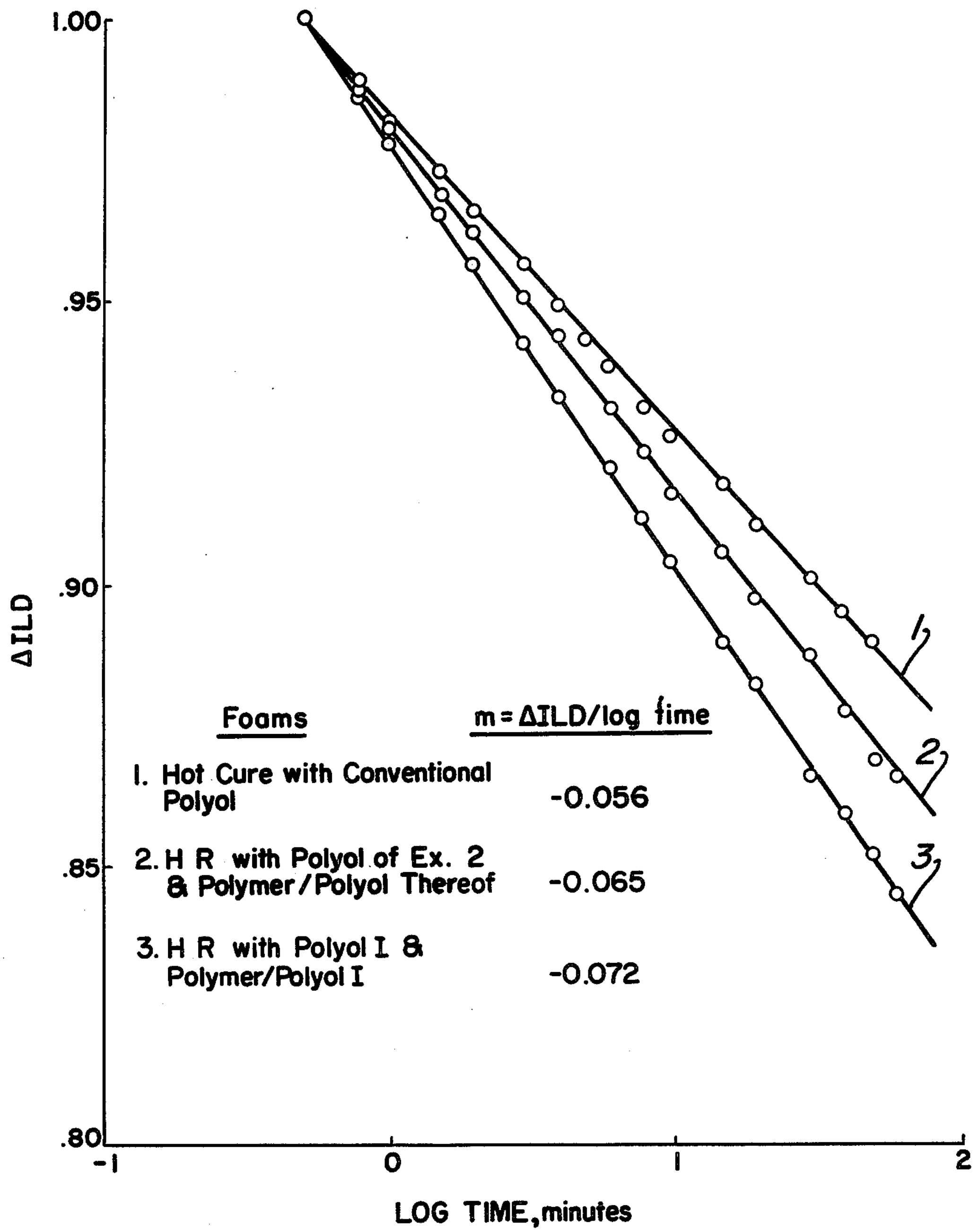
FIG. 3 shows plots of the fraction of load retained (Δ ILD) by a "hot cure" polyurethane foam, a high resiliency (HR) polyurethane foam of this invention and a prior art high resiliency polyurethane foam versus logarithmic time.

The rates of stress relaxation for the high resiliency foams prepared with the polyols and polymer/polyols of Examples 1 to 8 are also listed in Table VII. The foams based on polyols of 28 hydroxyl number (Examples 1, 2, 5 and 6) exhibit slightly improved stress relaxation properties as compared to the control foam based on prior art Polyol I and Polymer/Polyol I. Graphical representation of these rates of stress relaxation is shown in FIG. 3 where a comparison is also made with a molded foam prepared with a conventional, "hot-cure" formulation. Considerable improvement is also noted for the foams from the polyols and polymer/-polyols of Examples 1 to 8 when they are compared to the foam based on prior art Polyol IV and Polymer/-Polyol I.

In Examples 1 to 8, polyols having a hydroxyl number of about 28 and an average functionality of about 4 (i.e., the polyol of Example 2 with the narrow functionality distribution and the polyol of Example 6 with the broad functionality distribution) appear to provide high resiliency foams with the best combination of humid aging and stress relaxation properties. Hence, these polyols were foamed on the low pressure/high shear Admiral machine according to the conditions described above. Molded foams so prepared with these polyols exhibited good reactivity, excellent green strength and appeared to have a more open cellular structure at demold. These foams could be demolded five minutes after pour with no apparent green strength deficiencies. The physical properties obtained for these machine-prepared foams are summarized in Table VII A and exhibit similar trends as observed for the bench-molded foams of Table VII.

TABLE I

| Preparation of Polyol Intermediates | | | | | | | | |
|---|---|---|---|---|---|---|---|---|
| Example 1 | | 1 | | 2 | | 3 | | 4 |
| Step 1 | | | | | | | | (7) |
| Erythritol, grams | | 1000 | | | | | | |
| Sorbitol, grams | | | | 720 | | | | |
| Glycerine, grams | | | | 180 | | 1032 | | |
| Propylene glycol, grams | | | | | | | | |
| Potassium hydroxide, flake, grams | | 4 | | 10 | | 10 | | |
| Temperature, ° C | | 150 | | 150–160 | | 140–150 | | |
| Stirring time, hours | | 1 | | 1 | | 1 | | |
| Pressure, mm Hg | | <5 | | <5 | | <5 | | |
| Step 2 | | | | | | | | (8) |
| Polyol from Step 1, grams | | 989 | | 899(2) | | 1032(3) | | |
| Propylene oxide feed, grams | | 3028 | | 3300 | | 4455 | | |
| Temperature, ° C | | 132–150 | | 110 | | 110 | | |
| Pressure, psig maximum | | 75 | | 60 | | 60 | | |
| Feed time, hours | | 4.25 | | 6.5 | | 3.5 | | |
| Cookout time, hours | | 2 | | 4 | | 4 | | |
| Step 3 | A(1) | B(1) | A | B | A | B | A | B |
| Potassium hydroxide, grams | 10(2) | 10(2) | 10 | 10 | 5 | 5 | 10 | |
| Polyol from Step 2, grams | 732(4) | 534(4) | 842(4) | 836(4) | 2657(4) | 2620(4) | 1383(4) | 687(4) |
| Propylene oxide feed, grams | 4389 | 2789 | 3300 | 3300 | 1980 | 1980 | 4455 | 2220 |
| Temperature, ° C | 110 | 110 | 110 | 110 | 110 | 110 | 110 | 110 |
| Pressure, psig, maximum | 60 | 60 | 60 | 60 | 60 | 60 | 60 | 60 |
| Feed time, hours | 7.5 | 7.5 | 4 | 4 | 3 | 3 | 5.5 | 6 |
| Cookout time, hours | — | — | 3 | 4 | 3.5 | 4 | 4.5 | 5.5 |
| | | | | | | | (5) | |
| Potassium hydroxide, grams | | 45 | | 60 | | 106 | | 34 |
| Temperature, ° C | | 140 | | 140 | | 140 | | 140 |
| Pressure, mm Hg | | <5 | | <5 | | <5 | | <5 |
| Time, hours | | 1 | | 1.5 | | 1 | | 1.5 |
| Example 1 | | 5 | | 6 | | 7 | | 8 |
| Step 1 | | | | | | | | |
| Erythritol, grams | | | | | | | | |
| Sorbitol, grams | | 765 | | 815 | | | | 700 |
| Glycerine, grams | | | | | | | | |
| Propylene glycol, grams | | 85 | | | | | | 200 |
| Potassium hydroxide, flake, grams | | 15 | | 20 | | | | 1.7 |
| Temperature, ° C | | 140 | | 140 | | | | 140 |
| Stirring time, hours | | 1 | | 0.25 | | | | 0.5 |
| Pressure, mm Hg | | 760 | | 760 | | | | 760 |
| Step 2 | | | | | | | | |
| Polyol from Step 1 | | 847(2) | | 806(2) | | | | 890 |
| Propylene oxide feed, grams | | 3300 | | 3222 | | | | 2567 |
| Temperature, ° C | | 122 | | 115 | | | | 155 |
| Pressure, psig, maximum | | 60 | | 60 | | | | 80 |
| Feed time, hours | | 5 | | 5.5 | | | | 8 |
| Cookout time, hours | | 2 | | 2 | | | | 2 |
| Step 3 | A | B | | | | | | |
| Potassium hydroxide, grams | 15 | 15 | 20 | 62 | | 100 | | |
| Polyol from Step 2 | 833 | 835 | 1659 | 1304(6) | | 2455 | | |
| Propylene oxide feed, grams | 3300 | 3300 | 6625 | 7013 | | 5874 | | |
| Temperature, ° C | 110 | 110 | 110 | 110 | | 110 | | |
| Pressure, psig, maximum | 60 | 60 | 60 | 60 | | 30 | | |
| Feed time, hours | 4 | 4 | 6 | 4.5 | | 7.5 | | |
| Cookout time, hours | 3 | 3 | 4.5 | 6.5 | | 4 | | |
| Potassium hydroxide, grams | 80 | | 67 | | | | | |
| Temperature, ° C | 140 | | 140 | | | | | |
| Pressure, mm Hg | 760 | | 760 | | | | | |

TABLE I-continued

| | Preparation of Polyol Intermediates | |
|---|---|---|
| Time, hours | 1 | 1.5 |

Footnotes to Table I
(1)"A" and "L" throughout this table denote two separate runs conducted in a given Example due to volume limitations of the reactor.
(2)Reactor was one-gallon stirred autoclave.
(3)Reactor was two-gallon stirred autoclave.
(4)Stripped under vacuum in same manner as in Step 1 after mixed with KOH.
(5)Product of Step 3 of run A of Example 4 (1810 grams) mixed with 12 grams of KOH and reacted with 2838 grams of propylene oxide at 110° C and 60 psig max. Feed time 3.5 hours and cookout time 4 hours. Polyol used as indicated in Table II.
(6)A mixture of 626 grams of a polyol produced as described in Step 2 of Example 1 and 626 grams of a polyol produced by reacting 3 moles of propylene oxide with one mole of glycerine in the presence of 0.1% KOH (unstripped).
(7)Same as in Step 1 of Example 1.
(8)Same as in Step 2 of Example 1.

TABLE II

| Preparation of Polyols | | | | |
|---|---|---|---|---|
| Example | | | | |
| Step 4 | 1 | 2 | 3 | 4 |
| Polyol from Step 3 | 18.8 | 17.75 | 20.15 | 13.99(a) |
| Temperature during propylene oxide feed,° C | 108-112 | 96-110 | 102-110 | 100-110 |
| Propylene oxide fed, lbs. | 21.5 | 33.1 | 65.0 | 22 |
| Duration of feed period, hrs. | 3.0 | 7.0 | 7.0 | 5.0 |
| Peak pressure, psig | 52 | 58 | 52 | 59 |
| Cook-out period, hrs. | 6.0 | 10.0 | 10.5 | 4.0 |
| Final pressure, psig | 0 | 12 | 0 | 0 |
| Hydroxyl number | 36.35 | 35.12 | 51.39 | 5.166 |
| Additional propylene oxide added, lbs. | 10.5 | 9.8 | 7.4 | 2.4 |
| Stripping temperature, ° C | 120 | 120 | 110-120 | 119-122 |
| Stripping pressure, mm Hg | 6 | 6 | 7 | 12-14 |
| Stripping period, hrs. | 3 | 3 | 4 | 4 |
| Hydroxyl number | 31.47 | 31.13 | 48.59 | 47.36(b) |
| Alkalinity, meq/gm | 0.231 | 0.249 | 0.245 | 0.245 |
| Step 5 | | | | |
| Ethylene oxide fed, lbs. | 3.9 | 3.85 | 6.2 | 3.4 |
| Capping temperature, ° C | 110-114 | 112-130 | 110-115 | 106-110 |
| Feed and cook-out periods, hrs. | 2 | 0.5 | 4 | 2.5 |
| Stripping temperature, ° C | 110 | 130-108 | 110 | 110 |
| Stripping pressure, mm Hg | 16-11 | 6 | 22-13 | 12 |
| Stripping period, hrs. | 1 | 1 | 1.5 | 1 |
| Crude product recovered, lbs. | 50.5 | 59 | 77 | 48 |
| Magnesium silicate added, lbs. | 1.01 | 1.18 | 1.54 | 0.96 |
| Agitation period, hrs. | 17 | 12 | 9.5 | 14.5 |
| Autoclave temperature, ° C | 81-98 | 100 | 94-96 | 98-100 |
| Ionol added, lbs. | 0.01 | 0.0118 | 0.015 | 0.0096 |
| Filtered product recovered, lbs. | 45.2 | 48.0 | 67.0 | 45.0 |
| Filtration period, hrs. | 10.5 | 16.0 | 19.5 | 4.0 |
| Final stripping period, hrs. | 3 | 3.5 | 4 | 3 |
| Autoclave temperature,° C | 101-108 | 100 | 99-105 | 98-100 |
| Autoclave pressure, mm Hg | 18-14 | 15-13 | 16-20 | 16-5 |
| Final product recovered, lbs. | 39.54 | 43.33 | 54.7 | 41.4 |
| Example | 5 | 6 | 7 | 8 |
| Step 4 | | | | |
| Polyol from Step 3, lbs. | 17.83 | 18.0 | 18.0 | 18.0 |
| Temperature during propylene oxide feed, ° C | 105-110 | 108-110 | 108-112 | 107-114 |
| Propylene oxide fed, lbs. | 55 | 45.0 | 20.0 | 53.0 |
| Duration of feed period, hrs. | 10.0 | 8.0 | 4.25 | 7.0 |
| Peak pressure, psig | 60 | 57 | 60 | 60 |
| Cook-out period, hrs. | 8.5 | 5.0 | 5.0 | 5.0 |
| Final pressure, psig | 24 | 3 | 8 | 2 |
| Hydroxyl number | — | — | 52.82 | — |
| Additional propylene oxide added, lbs. | — | — | 3.8 | — |
| Stripping temperature, ° C | 116-120 | 117-120 | 120 | 120 |
| Stripping pressure, mm Hg | 7 | 6-7 | 6-5 | 12-7 |
| Stripping period, hrs. | 3 | 3 | 3 | 5 |
| Hydroxyl number | 28.86 | 31.77 | 47.18 | 46.86 |
| Alkalinity, meq/gm | 0.239 | 0.237(c) | 0.274 | 0.252 |
| Step 5 | | | | |
| Ethylene oxide fed, lbs. | 5.5 | 4.2 | 3.1 | 5.3 |
| Capping temperature, ° C | 110-112 | 110-120 | 110 | 111-120 |
| Feed and cook-out periods, hrs. | 3.5 | 4.0 | 2.75 | 2.5 |
| Stripping temperature, ° C | 110 | 110 | 110 | 110 |
| Stripping pressure, mm Hg | 10 | 7 | 7 | 7 |
| Stripping period, hrs. | 1 | 1 | 1 | 1 |
| Crude product recovered, lbs. | 72 | 53 | 42 | 70 |
| Magnesium silicate added, lbs. | 1.44 | 1.33 | 0.84 | 1.4 |
| Agitation period, hrs. | 11 | 10 | 8 | 8 |
| Autoclave temperature, ° C | 100 | 100 | 95-100 | 90-99 |
| Ionol added, lbs. | 0.014 | 0.013 | 0.003 | 0.014 |
| Filtered product recovered, lbs. | 66 | 58.0 | 41.4 | 53 |
| Filtration period, hrs. | 12.0 | 9.0 | 3.0 | 17 |
| Final stripping period, hrs. | 8 | 3 | 3 | 3 |

TABLE II-continued

| | Preparation of Polyols | | | |
|---|---|---|---|---|
| Autoclave temperature, ° C | 100 | 98-100 | 100-102 | 99-108 |
| Autoclave pressure, mm Hg | 13 | 6-7 | 7 | 10-8 |
| Final product recovered, lbs. | 63.0 | 51.9 | 38.2 | 48.8 |

(a) Polyol of run 4B of Table 1.
(b) Added 1.5 gallons of polyol of run 4A of Table 1.
(c) Added potassium metal to increase alkalinity from 0.209 to 0.237 meq/gm.

TABLE III

| | Properties of Polyols | | | |
|---|---|---|---|---|
| Examples | 1 | 2 | 3 | 4 |
| Analyses of final product | | | | |
| Hydroxyl number | 28.87 | 29.15 | 45.95 | 44.89 |
| Acid number | 0.01 | 0.014 | 0.021 | 0.018 |
| Water % | 0.013 | 0.01 | 0.01 | 0.01 |
| Total alkalinity, meq/gm | 0.00009 | 0.00014 | 0.000095 | 0.00015 |
| Viscosity, cks at 25° C | 1294 | 1471 | 619 | 763 |
| Primary hydroxyl, mole - % | 70 | 63 | 58 | 51 |
| Average functionality | 3.45 | 3.86 | 2.99 | 3.78 |
| Oxyethylene, % | 8.09 | 5.65 | 5.74 | 7.25 |
| Unsaturation, meq/gm | 0.076 | 0.074 | 0.040 | 0.040 |
| Examples | 5 | 6 | 7 | 8 |
| Analyses of final product | | | | |
| Hydroxyl number | 27.84 | 29.14 | 44.15 | 43.62 |
| Acid number | 0.017 | 0.013 | 0.008 | 0.013 |
| Water, % | 0.01 | 0.01 | 0.01 | 0.01 |
| Total alkalinity, meq/gm | 0.00014 | 0.00012 | 0.00012 | 0.000094 |
| Viscosity, cks at 25° C | 1464 | 1441 | 645 | 792 |
| Primary hydroxyl, mole - % | 75 | 63 | 60 | 47 |
| Average functionality | 3.68 | 4.07 | 2.99 | 4.18 |
| Oxyethylene, % | 7.29 | 6.31 | 5.63 | 6.72 |
| Unsaturation, meq/gm | 0.084 | 0.077 | 0.041 | 0.041 |

TABLE V

| PROPERTIES OF POLYMER/POLYOLS | | | | |
|---|---|---|---|---|
| Polymer/Polyol From Polyol of Example | 1 | 2 | 3 | 4 |
| Total Poly A by Calc., % | 16.80 | 16.80 | 16.47 | 16.48 |
| Total Poly S by Calc., % | 4.41 | 4.37 | 4.34 | 4.40 |
| Total Polymer by Calc., % | 21.25 | 21.17 | 20.81 | 20.88 |
| Viscosity at 25° C, Hoeppler, cps | 3239 | 3498 | 1453 | 1749 |
| Hydroxyl No.: | | | | |
| Calculated | 22.75 | 22.98 | 36.39 | 35.52 |
| Measured | 22.75 | 23.18 | 35.21 | 34.80 |
| Water, % | 0.01 | 0.02 | 0.01 | 0.01 |
| Filterability, | | | | |
| 150 Mesh Screen, % Thru | 100 | 100 | 100 | 100 |
| Solids on Screen, ppm | 7 | 4 | 7 | 3 |
| 700 Mesh Screen, | | | | |
| Time, Sec. | 278 | 280 | 278 | 201 |
| % Thru | 100 | 100 | 100 | 100 |
| Solids on screen, ppm | 18 | 9 | 18 | 10 |
| Centrifugible Solids | 1.68 | 1.87 | 2.50 | 1.78 |
| Polymer/Polyol From Polyol of Example | 5 | 6 | 7 | 8 |
| Total Poly A by Calc., % | 4.43 | 4.46 | 4.39 | 4.33 |
| Total Polymer by Calc., % | 21.34 | 21.55 | 21.05 | 20.73 |
| Viscosity at 25° C, Hoeppler, cps | 3691 | 3676 | 1497 | 1800 |
| Hydroxyl No.: | | | | |

TABLE IV

| PREPARATION OF POLYMER/POLYOLS | | | | |
|---|---|---|---|---|
| Polyol of Example | 1 | 2 | 3 | |
| Polyol Properties (analytical) | | | | |
| Average Functionality | 3.45 | 3.86 | 2.9 | |
| Primary Hydroxyl, mole - % | 70 | 63 | 58 | |
| Oxyethylene, % | 8.09 | 5.65 | 5.74 | |
| Reaction Conditions | | | | |
| Reaction Temperature, ° C | 120 | 120 | 120 | |
| Residence Time, min. | 12 | 12 | 12 | |
| VAZO Conc., wt. % in total feed | 0.41 | 0.41 | 0.41 | |
| Monomer + VAZO Content in Feed % | 23.4 | 23.2 | 23.1 | |
| Ratio of Acrylonitrile to Styrene in Feed, by wt. | 80/20 | 80/20 | 80/20 | |
| Polyol Feed Rate, gm/hr | 2105 | 2130 | 2131 | |
| Monomer + VAZO Feed Rate gm/hr | 641 | 644 | 642 | |
| Product Weight, gm/hr | 2740 | 2764 | 2766 | |
| total, gm | 7803 | 9286 | 11,20 | |
| Material Balance, % | 99.8 | 99.7 | 99.7 | |
| Residual Acrylonitrile, % | 1.94 | 1.81 | 2.13 | |
| Styrene, % | 0.28 | 0.29 | 0.32 | |
| TMSN, % | 0.15 | 0.18 | 0.16 | |
| Conversions, Acrylonitrile, % | 89.5 | 90.1 | 88.3 | |
| Styrene, % | 93.9 | 93.7 | 93.0 | |
| Combined, % | 90.3 | 90.8 | 89.3 | |
| Polyol of Example | 5 | 6 | 7 | 8 |
| Polyol Properties (analytical) | | | | |
| Average Functionality | 3.68 | 4.07 | 2.99 | 4.18 |
| Primary Hydroxyl, mole - % | 75 | 63 | 60 | 47 |
| Oxyethylene, % | 7.29 | 6.31 | 5.63 | 6.72 |
| Reaction Conditions | | | | |
| Reaction Temperature, ° C | 120 | 120 | 120 | 120 |
| Residence Time, min. | 12 | 12 | 12 | 12 |
| VAZO Conc., wt. % in total feed | 0.41 | 0.41 | 0.41 | 0.40 |
| Monomer + VAZO content in feed,% | 23.3 | 23.5 | 23.4 | 23.1 |
| Ratio of Acrylonitrile to Styrene in Feed, by wt. | 80/20 | 80/20 | 80/20 | 80/20 |
| Polyol Feed Rate, gm/hr | 2106 | 2102 | 2126 | 2144 |
| Monomer + VAZO Feed Rate, bm/hr | 2767 | 2741 | 2762 | 2782 |
| total, gm | 15,085 | 10,401 | 7955 | 9736 |
| Material Balance, % | 100.7 | 99.7 | 99.6 | 99.8 |
| Residual Acrylonitrile, wt. % | 1.77 | 1.74 | 2.13 | 2.11 |
| Styrene, wt. % | 0.25 | 0.26 | 0.31 | 0.32 |
| TMSN, wt. % | 0.16 | 0.10 | 0.12 | 0.10 |
| Conversions, Acrylonitrile, % | 90.3 | 90.6 | 88.5 | 88.4 |
| Styrene, % | 94.5 | 94.4 | 93.3 | 93.0 |
| Combined, % | 91.1 | 91.4 | 89.4 | 89.3 |

TABLE V-continued

| PROPERTIES OF POLYMER/POLYOLS | | | | |
|---|---|---|---|---|
| Calculated | 21.90 | 21.86 | 34.86 | 34.60 |
| Measured | 21.75 | 22.66 | 35.06 | 34.70 |
| Water, % | 0.01 | 0.01 | 0.01 | 0.01 |
| Filterability, 150 Mesh Screen, % Thru | 100 | 100 | 100 | 100 |
| Solids on Screen, ppm | 7 | 5 | 7 | 4 |
| 700 Mesh Screen, Time, Sec. | 200 | 274 | 195 | 199 |
| % Thru | 100 | 100 | 100 | 100 |
| Solids on screen, ppm | 12 | 17 | 8 | 7 |
| Centrifugible Solids | 1.80 | 0.75 | 1.10 | 1.46 |

Footnotes to Table IV (1) The amounts of starting materials employed in producing the polyols of Examples 1 to 8 were selected to result in polyols having these ("target") properties.

(2) This arrow and the arrows in the other Tables indicate that the amounts of materials and/or reaction conditions shown for the first Example or experiment were also employed in the Examples or experiments through which the arrow was drawn.

(3) These are the properties of the polyols produced in the Examples as determined by analysis.

TABLE VI

| A SUMMARY OF PROPERTIES OF POLYOLS AND POLYMER/POLYOLS | | | | |
|---|---|---|---|---|
| Example | 1 | 2 | 3 | 4 |
| Polyols | | | | |
| Target Properties (1) | | | | |
| Hydroxyl No. | 28 | 28 | 45 | 45 |
| Equivalent Weight | 2000 | 2000 | 1250 | 1250 |
| Average Functionality | 3 | 4 | 3 | 4 |
| Functionality Distribution | Narrow | Narrow | Narrow | Narrow |
| Capping | 7% Ethylene Oxide | → | → | →(2) |
| Analytical Properties (3) | | | | |
| Polyols | | | | |
| Hydroxyl No. | 28.9 | 29.15 | 45.95 | 44.9 |
| Functionality | 3.45 | 3.86 | 2.99 | 3.78 |
| Primary Hydroxyls, mole-% | 70 | 63 | 58 | 51 |
| Viscosity, centistokes at 25° C | 1294 | 1471 | 619 | 763 |
| Polymer Polyols | | | | |
| Hydroxyl No. | 22.75 | 23.2 | 35.2 | 34.8 |
| Viscosity, centipoises at 25° C (Hoeppler) | 3239 | 3498 | 1453 | 1749 |
| Example | 5 | 6 | 7 | 8 |
| Polyols | | | | |
| Target Properties | | | | |
| Hydroxyl No. | 28 | 28 | 45 | 45 |
| Equivalent Weight | 2000 | 2000 | 1250 | 1250 |
| Average Functionality | 3 | 4 | 3 | 4 |
| Functionality Distribution | Broad | Broad | Broad | Broad |
| Capping | 7% Ethylene Oxide | → | → | → |
| Analytical Properties | | | | |
| Polyols | | | | |
| Hydroxyl No. | 27.8 | 29.1 | 44.15 | 43.6 |
| Functionality | 3.68 | 4.07 | 2.99 | 4.18 |
| Primary Hydroxyls, mole-% | 75 | 63 | 60 | 47 |
| Viscosity, centistokes at 25° C | 1464 | 1441 | 645 | 792 |
| Polymer/Polyols | | | | |
| Hydroxyl No. | 21.75 | 22.7 | 35.1 | 34.7 |
| Viscosity, centipoises at 25° C (Hoeppler) | 3691 | 3676 | 1497 | 1800 |

(1) The amounts of starting materials employed in producing the polyols of Examples 1 to 8 were selected to result in polyols having these ("target") properties.
(2) This arrow and the arrows in the other Tables indicate that the amounts of materials and/or reaction conditions shown for the first example or experiments through which the arrow was drawn.
(3) These are the properties of the polyols produced in the Examples as determined by analysis.

TABLE VII

| FORMULATIONS AND PHYSICAL PROPERTIES OF POLYURETHANE FOAMS (Laboratory Scale Preparations) | | | | | |
|---|---|---|---|---|---|
| Example | | | 1 | 2 | 3 |
| Polyol Properties(Analytical) | | | | | |
| Hydroxyl No | | | 28.9 | 29.15 | 45.95 |
| Average Functionality | | | 3.45 | 3.86 | 2.99 |
| Functionality Distribution | | | Narrow | Narrow | Narrow |
| Formulation, pbw(1) | | | | | |
| Polyol I | 60 | | | | |
| Polyol IV | | 60 | | | |
| Polymer/Polyol I | 40 | 40 | | | |
| Polyol of Example | | | 60 | 60 | 60 |
| Polymer/Polyol of Example | | | 40 | 40 | 40 |
| Amine Catalyst I | 0.10 | 0.10 | 0.10 | 0.10 | 0.15 |
| Amine Catalyst II | 0.36 | 0.36 | 0.36 | 0.30 | 0.36 |

TABLE VII-continued

FORMULATIONS AND PHYSICAL PROPERTIES OF POLYURETHANE FOAMS (Laboratory Scale Preparations)

| | | | | | |
|---|---|---|---|---|---|
| Amine Catalyst III | 0.30 | 0.30 | 0.30 | 0.30 | 0.30 |
| Dibutyltindilaurate | 0.015 | 0.03 | 0.03 | 0.03 | 0.03 |
| Silicone I | 1.7 | 1.7 | 1.7 | 1.7 | 1.7 |
| Physical Properties | | | | | |
| Mold Exit Time, sec. | 60 | 55 | 63 | 64 | 45 |
| Density, Overall, pcf | 3.00 | 2.93 | 2.95 | 2.99 | 3.00 |
| Core, pcf | 2.66 | 2.60 | 2.62 | 2.78 | 2.73 |
| Porosity, $ft.^3/min/ft^2$ | 14.9 | 28.5 | 14.4 | 17.2 | 11.7 |
| Resiliency, % ball rebound | 63 | 64 | 65 | 64 | 59 |
| ILD ($lbs/50 in^2$) | | | | | |
| 25% | 40.0 | 36.0 | 41.6 | 42.6 | 43.2 |
| 65% | 105.0 | 95.4 | 106.7 | 111.0 | 113.5 |
| 25% Return, % | 82.2 | 79.7 | 83.6 | 82.1 | 83.4 |
| Load Ratio | 2.63 | 2.65 | 2.57 | 2.60 | 2.63 |
| Tensile Strength, psi | 23.2 | 26.0 | 20.5 | 18.3 | 20.2 |
| Elongation, % | 154 | 197 | 143 | 122 | 124 |
| Tear Resistance, pli | 2.20 | 2.65 | 1.41 | 1.28 | 1.68 |
| 75% Compression Set, % | 8.0 | 10.9 | 8.0 | 7.6 | 7.9 |
| Humid Aging (5 hrs at 120° C) | | | | | |
| 50% Compression Set, % | 17.2 | 21.8 | 16.0 | 13.1 | 19.3 |
| Load Loss, % | 28.9 | 13.6 | 8.7 | 6.6 | 25.7 |
| Rate of Stress Relaxation, | | | | | |
| ΔILD/log time | 0.072 | 0.085 | 0.066 | 0.065 | 0.072 |
| Example | 4 | 5 | 6 | 7 | 8 |
| Polyol Properties(Analytical) | | | | | |
| Hydroxyl No., | 44.9 | 27.8 | 29.1 | 44.15 | 43.6 |
| Average Functionality | 3.78 | 3.68 | 4.07 | 2.99 | 4.18 |
| Functionality Distribution | Narrow | Broad | Broad | Broad | Broad |
| Formulation, pbw[(1)] | | | | | |
| Polyol I | | | | | |
| Polyol IV | | | | | |
| Polymer/Polyol I | | | | | |
| Polyol of Example | 60 | 60 | 60 | 60 | 60 |
| Polymer/Polyol of Example | 40 | 40 | 40 | 40 | 40 |
| Amine Catalyst I | 0.10 | 0.10 | 0.10 | 0.20 | 0.10 |
| Amine Catalyst II | 0.36 | 0.36 | 0.30 | 0.36 | 0.36 |
| Amine Catalyst III | 0.30 | 0.30 | 0.30 | 0.30 | 0.30 |
| Dibutyltindilaurate | 0.015 | 0.03 | 0.03 | 0.03 | 0.015 |
| Silicone I | 1.5 | 1.7 | 1.7 | 2.0 | 1.5 |
| Physical Properties | | | | | |
| Mold Exit Time, sec. | 53 | 67 | 61 | 37 | 52 |
| Density, Overall, pcf | 3.02 | 2.91 | 2.95 | 3.02 | 3.06 |
| Core, pcf | 2.73 | 2.71 | 2.66 | 2.76 | 2.74 |
| Porosity, $ft^3/min/ft^2$ | 23.0 | 33.9 | 12.4 | 14.5 | 22.0 |
| Resiliency, % ball rebound | 62 | 67 | 63 | 60 | 63 |
| ILD ($lbs/50 in^2$) | | | | | |
| 25% | 47.9 | 37.9 | 41.7 | 45.5 | 41.0 |
| 65% | 125.8 | 100.0 | 108.5 | 117.0 | 130.5 |
| 25% Return, % | 83.7 | 83.9 | 83.2 | 83.2 | 84.0 |
| Load Ratio | 2.62 | 2.64 | 2.60 | 2.57 | 2.56 |
| Tensile Strength, psi | 18.1 | 18.9 | 18.6 | 20.4 | 16.1 |
| Elongation, % | 98 | 130 | 124 | 121 | 87 |
| Tear Resistance, pli | 0.98 | 1.42 | 1.00 | 1.25 | 0.87 |
| 75% Compression Set, % | 6.7 | 9.6 | 9.3 | 7.2 | 6.6 |
| Humid Aging (5 hrs at 120° C) | | | | | |
| 50% Compression Set, % | 13.1 | 17.1 | 16.1 | 17.2 | 13.4 |
| Load Loss, % | 22.8 | 2.3 | 7.4 | 24.7 | 22.8 |
| Rate of Stress Relaxation, | | | | | |
| ΔILD/log time | 0.069 | 0.069 | 0.067 | 0.069 | 0.070 |

(1)All formulations contained 2.6 parts by weight water and contained Isocyanate I (105 Index).

TABLE VIIA

Formulation and Physical Properties of Polyurethane Foam (Large Scale Preparations)

| Polyol | I | Ex. 2 | Ex. 6 |
|---|---|---|---|
| Hydroxyl Number (analytical) | 34 | 29.15 | 29.14 |
| Functionality (analytical) | 2.6 | 3.86 | 4.07 |
| Functionality Distribution | Broad | Narrow | Broad |
| Formulation, pbw | | | |
| Polyol | 60 | → | → |
| Polymer Polyol | 40 | | |
| Water | 2.6 | | |
| Amine Catalyst I | 0.10 | 0.10 | 0.10 |
| Triethylene Diamine (Solid) | 0.12 | — | — |
| Amine Catalyst II | — | 0.36 | 0.36 |
| Amine Catalyst III | 0.30 | 0.30 | 0.30 |
| Dibutyltindilaurate | 0.015 | 0.03 | 0.03 |

TABLE VIIA-continued

Formulation and Physical Properties of Polyurethane Foam (Large Scale Preparations)

| Polyol | I | Ex. 2 | Ex. 6 |
|---|---|---|---|
| Silicone III | 0.75 | — | — |
| Silicone I | — | 1.7 | 1.7 |
| Isocyanate I | 105 Index | → | → |
| Physical Properties | | | |
| Mold Exit Time, seconds | 55 | 51 | 53 |
| Density, overall, pcf | 2.95 | 2.97 | 3.01 |
| core, pcf | 2.72 | 2.73 | 2.73 |
| Porosity, $ft^3/min/ft^2$ | 18.5 | 18.5 | 26.1 |
| Resiliency, % ball rebound | 63 | 66 | 67 |
| ILD ($lbs/50 in^2$) | | | |
| 25% | 42.5 | 39.9 | 44.9 |

TABLE VIIA-continued

| Formulation and Physical Properties of Polyurethane Foam (Large Scale Preparations) | | | |
|---|---|---|---|
| Polyol | I | Ex. 2 | Ex. 6 |
| 65% | 111.8 | 105.0 | 118.5 |
| 25% Return | — | 84.2 | — |
| Load Ratio | 2.63 | 2.63 | 2.64 |
| Tensile Strength, psi | 23.4 | 20.1 | 21.5 |
| Elongation, percent | 152 | 134 | 130 |
| Tear Resistance, pli | 1.55 | 1.17 | 1.15 |
| 75% Compression Set, % | 8.3 | 8.0 | 8.3 |
| Humid Aging (5 Hours at 120° C) | | | |
| 50% Compression Set, % | 18.0 | 12.3 | 13.1 |
| Load Loss, % | 29.0 | 8.4 | 11.3 |
| Rate of Stress Relaxation | | | |
| - Δ ILD/log time | .069 | .063 | .064 |

EXAMPLES 9 to 20

Since the sorbitol-started polyol of Example 6 (29 hydroxyl number and 4 average functionality) provided foams with an excellent combination of stress relaxation and humid aging properties, this starter was selected to investigate the effects of polyol equivalent weight (hydroxyl number) over a rather narrow range of hydroxyl numbers (i.e., 26 to 34) in Examples 9 to 20. Since no significant difference was observed between the polyols of narrow and broad distribution of average functionality in Examples 1 to 8, to polyols of Examples 9 to 20 were made with a broad distribution. Polyols with a broad functionality distribution do not require special stripping procedures or anhydrous potassium catalysis and so are readily produced by current production technology.

Hence, Examples 9, 10 and 11 were conducted to produce polyols having hydroxyl numbers from 26 to 34, using sorbitol as the starter, 7% ethylene oxide as the cap and broad distribution of functionality. Example 12 was similar to Example 10 but with 5% ethylene oxide. Steps 1 to 3 for the preparation of the polyols of Examples 9 to 12 are shown in Table VIII. Steps 4 and 5 are shown in Table IX. The properties of the polyols are shown in Table X.

The formulations and physical properties of molded, high resiliency foams prepared from the polyols of Examples 6 and 8 to 11 are given in Table XI. Utilizing the formulations presented, excellent foams were produced with the usual molding conditions given above. The foams tended to be less tight as the hydroxyl number of polyols was reduced. Since the average functionality of the polyols used in the formulations of Table XI varied, a strict comparison of foam physical properties based on polyol equivalent weight (hydroxyl number) differences should be made with reservations. However, it may be generally concluded that foam load-bearing properties increase in accord with lower polyol equivalent weights (higher polyol hydroxyl numbers). In addition, elongation and tear resistance properties tend to decrease with lower equivalent weights (higher hydroxyl numbers) of the polyols. Although humid aged compression set values appear to be unaffected by the polyol equivalent weight, the humid aged load loss values exhibit a trend of becoming progressively worse at lower polyol equivalent weights (higher hydroxyl numbers). The rates of foam stress relaxation appear to be better for polyols in the hydroxyl number range of 28 to 34. Hence, hydroxyl numbers of 30 and 34 were chosen for Examples 12 to 20.

Thus, series of polyols were made with ethylene oxide contents from 0 to 6 and with either hydroxyl numbers of about 30 (Examples 12 to 16) or hydroxyl numbers of about 34 (Examples 17 to 20) to determine the optimum ethylene oxide content. Steps 1 to 3 in the preparation of the polyols of Examples 13 to 20 are shown in Table XII; Steps 4 and 5 are shown in Table XIII. The properties of the polyols are shown in Table XIV.

Polymer/polyols were prepared from the polyols of Examples 9 to 20. These preparations are tabulated in Tables XV and XVI. The properties of the polymer/polyols are shown in Tables XVII and XVIII.

The properties of the polyols and polymer/polyols of Examples 13 to 16, having hydroxyl numbers of about 30 and varying ethylene oxide content, are shown in Table XIX. The number of primary hydroxyls in the polyols varied from 0 to 67 percent in accordance with the amount of ethylene oxide (0 to 7 percent by weight) used for capping. A typical molded, high resiliency foam formulation based on 2.6 pbw of water was used to evaluate these polyol/polymer combinations. As shown in Table XX, the amount of silicone surfactant was adjusted in an attempt to prepare suitable foams. For the polyol containing no ethylene oxide capping, stable foams could not be prepared. At the polyol capping level of 3 percent by weight ethylene oxide, stable foams were produced, but they contained significant surface voids. Excellent molded foams were produced at typical levels with the polyols containing 5 and 7 percent by weight ethylene oxide capping. The physical properties of these foams were comparable. The slight differences in tensile, elongation and tear resistance properties may be attributed to the differences in the average functionality of the base polyols, as given in Table XX. Based on these data, it may be concluded that for polyols of average functionality greater than four, at least 45 mole % primary hydroxyls (5 percent by weight ethylene oxide capping) are very desirable for the preparation of suitable molded, high resiliency foams with current formulations.

Similarly, the effect of varying the ethylene oxide capping at a hydroxyl number of 34 was studied in Examples 17 to 20. The foam formulation and foam properties are shown in Table XXI. The data in Table XXI lend support to the conclusions reached above in connection with Table XX and extends desirable range of primary hydroxyls to 35 mole percent.

The higher functionality polyols prepared with 5 and 7 percent ethylene oxide capping (i.e., those of Examples 9-12, 15, 16, 19 and 20) reduced the humidity sensitivity of the molded high resiliency foams made therefrom. Although the primary hydroxyl content of these polyols is lower than current commercial high resiliency foam polyols (prepared with 15 percent ethylene oxide) each of these polyols provided molded foams with good reactivity as evidenced by their excellent demold characteristics.

TABLE VIII

| Preparation of Polyol Intermediates For Examples 9 to 12 | | |
|---|---|---|
| | Step 1 | Step 3 |
| Autoclave charge, lbs. | | |
| Sorbitol (70% aqueous) (a) | 25.17 | |
| Step 2 product | | 20 |
| Stripping data | | |
| Temperature, °C | 125 | |
| Pressure, mm Hg | 18–20 | |
| Time, hours | 3 | |

TABLE VIII-continued

| Preparation of Polyol Intermediates For Examples 9 to 12 | Step 1 | Step 3 |
|---|---|---|
| Potassium hydroxide (Flake) | 0.13 (b) | 0.13 (c) |
| | Step 2 | |
| Feed data | | |
| Propylene oxide, lbs. | 67.4 | 75 |
| Temperature, ° C | 115 | 110 |
| Pressure, psig max. | 59 | 61 |
| Feed Time, Hours | 10 | |
| Cookout time, hours | 2 | |
| Analysis of Crude Stripped Polyol | | |
| Hydroxyl number | 394 | 92.74 |
| Alkalinity, % KOH | 0.13 | 0.061 |
| Viscosity, cks at 25° C | 12,356 | |

(a) Equivalent to 17.67 lbs. of dry sorbitol.
(b) KOH added after 3 hours stripping period and dissolved for 1 hour at 125° C.
(c) KOH dissolved in starter for 1 hour at 125° C.

TABLE IX

| Preparation of Polyols<br>Example | 9 | 10 | 11 | 12 |
|---|---|---|---|---|
| Step 4 | | | | |
| Autoclave charge, lbs. | | | | |
| Starter from Step 3 of Table VIII | 18.0 | 21.0 | 25.0 | 21.0 |
| Potassium hydroxide (flake), lbs. | 0.25 | 0.17 | 0.19 | 0.24 |
| Agitation period to dissolve KOH, hrs. | 2 | 2 | 2 | 2 |
| Reactor temperature to dissolve KOH, ° C (1) | 128–131 | 130 | 130 | 124–130 |
| Temperature during propylene oxide feed, ° C | 110 | 110 | 110 | 110 |
| Propylene oxide feed, lbs. | 63.0 | 54.0 | 54.0 | 58.0 |
| Maximum pressure, psig | 57 | 54 | 60 | 61 |
| Feed period, hrs. | 9.5 | 10 | 17 | 10.5 |
| Cookout period, hrs. | 7 | 4 | 9 | 7 |
| Stripping period, hrs. | 3 | 3 | 3 | 3 |
| Stripping temperature, ° C | 110 | 110 | 110 | 110 |
| Stripping pressure, mm/Hg | 20–24 | 20 | 20 | 18–20 |
| Hydroxyl number | 28.09 | 32.2 | 35.04 | 31.48 |
| Alkalinity, % KOH | 0.25 | 0.24 | 0.22 | 0.22 |
| Step 5 | | | | |
| Ethylene oxide added, cc's | 3140 | 2990 | 3050 | 2130 |
| Ethylene oxide, feed temperature, ° C | 110 | 110 | 110 | 110 |
| Ethylene oxide feed period, hrs. | 2.67 | 1.83 | 1.58 | 1.50 |
| Maximum pressure, psig | 44 | 51 | 46 | 42 |
| Cookout period, hrs. | 1.75 | 1.25 | 0.75 | 2.0 |
| Stripping period, hrs. | 1.0 | 1.0 | 1.0 | 1.0 |
| Stripping temperature, ° C | 110 | 110 | 110 | 110 |
| Stripping pressure, mm/Hg | 20 | 20 | 20 | 18–19 |
| Crude product recovered, lbs. | 81.9 | 69.0 | 74.7 | 77.8 |
| Magnesium silicate added, lbs. | 1.62 | 1.37 | 1.46 | 1.56 |
| Agitation period, hrs. | 9 | 9.5 | 8 | 8 |
| Reactor temperature, ° C | 86–90 | 84–94 | 80–95 | 93 |
| Ionol added, lbs. | 0.016 | 0.014 | 0.015 | 0.016 |
| Filtration period, hrs. | 25 | 15.5 | 16 | 19 |
| Filtrate recovered, lbs. | 75.2 | 64.2 | 68.3 | 72.1 |
| Stripping period, hrs. | 3 | 3 | 3 | 3 |
| Stripping temperature, ° C | 99–102 | 96–108 | 100 | 100 |
| Stripping pressure, mm/Hg | 12–15 | 18–20 | 20–25 | 9–12 |
| Refined product recovered, lbs. | 72.7 | 57.8 | 56.2(2) | 69.2 |

(1) Sparged nitrogen up through unit to keep KOH suspended.
(2) No apparent reason for low yield.

TABLE X

| Polyol of Examples | Properties of Polyols<br>9 | 10 | 11 | 12 |
|---|---|---|---|---|
| Product analysis: | | | | |
| Hydroxyl number | 26.73 | 29.79 | 33.12 | 29.81 |
| Acid number | 0.005 | 0.004 | 0.003 | 0.004 |
| Water, % | 0.03 | 0.05 | 0.04 | 0.03 |
| Total alkalinity, meq/gm | 0.00005 | 0.00012 | 0.00007 | 0.00007 |
| Viscosity, cks at 25° C | 1737 | 1494 | 1331 | 1496 |
| Primary hydroxyl, mole % | 67 | 67 | 57 | 53 |
| Average functionality | 4.04 | 4.37 | 4.86 | 4.38 |
| Oxyethylene, % | 7 | 7 | 7 | 4.8 |
| Unsaturation, meq/gm | 0.096 | 0.071 | 0.053 | 0.075 |

TABLE XI

| Polyol<br>(OH No) | Preparation of Polyurethane Foams (Variation of Polyol OH No.)<br>Control Polyol I<br>(34) | 6<br>(29.14) | 8<br>(43.62) | 9<br>(26.73) | 10<br>(29.79) | 11<br>(33.12) |
|---|---|---|---|---|---|---|
| Formulation, pbw | | | | | | |
| Polyol | 60 | 60 | 60 | 60 | 60 | 60 |
| Polymer-Polyol* | 40 | 40 | 40 | 40 | 40 | 40 |
| Water | 2.6 | → | → | → | → | → |
| Amine Catalyst I | 0.10 | 0.10 | 0.10 | 0.10 | 0.10 | 0.10 |
| Amine Catalyst II | 0.36 | 0.30 | 0.36 | 0.30 | 0.30 | 0.30 |
| Amine Catalyst III | 0.30 | 0.30 | 0.30 | 0.30 | 0.30 | 0.30 |
| Dibutyltindilaurate | 0.015 | 0.03 | 0.015 | 0.03 | 0.03 | 0.03 |
| Silicone I | 1.7 | 1.7 | 1.5 | 1.7 | 1.7 | 1.7 |
| Isocyanate I | 105 Index | → | → | → | → | → |
| Physical Properties | | | | | | |
| Mold Exit Time, seconds | 60 | 61 | 52 | 60 | 61 | 63 |
| Density, overall, pcf | 3.00 | 3.00 | 3.06 | 2.98 | 2.95 | 2.97 |
| core, pcf | 2.68 | 2.64 | 2.74 | 2.63 | 2.58 | 2.61 |
| Porosity, $ft^3/min/ft^2$ | 16.1 | 23.0 | 22.0 | 29.2 | 26.5 | 27.0 |

TABLE XI-continued

| Polyol (OH No) | Control Polyol I (34) | 6 (29.14) | 8 (43.62) | 9 (26.73) | 10 (29.79) | 11 (33.12) |
|---|---|---|---|---|---|---|
| | Preparation of Polyurethane Foams (Variation of Polyol OH No.) | | | | | |
| Resiliency, % ball rebound | 62 | 66 | 63 | 66 | 64 | 69 |
| ILD (lbs/50 $in^2$) | | | | | | |
| 25% | 43.1 | 43.7 | 51.0 | 42.0 | 43.0 | 46.4 |
| 65% | 114.0 | 118.0 | 130.5 | 105.0 | 108.0 | 114.0 |
| 25% Return, % | 81.0 | 84.7 | 84.0 | 82.6 | 83.0 | 82.7 |
| Load Ratio | 2.65 | 2.70 | 2.56 | 2.50 | 2.51 | 2.46 |
| Tensile Strength, psi | 23.5 | 19.3 | 16.1 | 17.8 | 14.2 | 14.2 |
| Elongation, percent | 151 | 121 | 87 | 118 | 94 | 87 |
| Tear Resistance, pli | 1.82 | 1.12 | 0.87 | 1.36 | 0.99 | 0.83 |
| 75% Compression Set, % | 7.8 | 7.5 | 6.6 | 8.9 | 8.0 | 7.5 |
| Humid Aging (5 hrs. at 120° C) | | | | | | |
| 50% Compression Set, % | 18.9 | 13.5 | 13.4 | 13.6 | 12.0 | 12.3 |
| Load Loss, % | 25.3 | 5.5 | 22.8 | +9.2 | 9.2 | 11.9 |
| Rate of Stress Relaxation | | | | | | |
| −ΔILD/log time | .072 | .066 | .070 | .070 | .064 | .065 |

*made from polyol listed in same column; preparation summarized in Tables IV and XV.

TABLE XII

Preparation of Polyol Intermediates For Examples 13 to 20

| | Step 1 | Step 3 | Step 3 (repeat) | Composite (e) |
|---|---|---|---|---|
| Autoclave charge, lbs. | | | | |
| Sorbitol (70% aqueous)(a) | 25.17 | | | |
| Step 2 | | 20 | 20 | |
| Potassium hydroxide (flake) | 0.13(b) | 0.13(c) | 0.13(c) | |
| Stripping data | | | | |
| Temperature, ° C | 126 | | | |
| Pressure, mm Hg | 20 | | | |
| Time, hours | 3 | | | |
| Feed data | Step 2 | | | |
| Propylene oxide, lbs. | 67.4 | 75 | 75 | |
| Temperature, ° C | 110 | 112 | 112 | |
| Pressure, psig max. | 57 | 59 | 60 | |
| Feed time, hours | 13 | 16 | 15 | |
| Cookout time, hours | 3 | 5 | 7 | |
| Analysis of crude stripped product | | | | |
| Hydroxyl number | 378 | 82.94 | 83.83 | 85.65 |
| Alkalinity, % KOH | 0.085 | .302(d) | 0.276 | 0.262 |
| Viscosity, cks at 25° C | 8,731 | 1,002 | 945 | 942 |

(a)Equivalent to 17.67 lbs. of dry sorbitol.
(b)KOH added after 3 hours stripping period and dissolved for 1 hour at 126° C.
(c)KOH dissolved in starter for 1 hour at 125° C.
(d)High alkalinity assumed because of residual KOH left in reactor.
(e)Composite of the two Step 3 runs shown in this Table and another run made under essentially the same conditions.

TABLE XIII

Preparation of Polyols

| Example | 13 | 14 | 15 | 16 |
|---|---|---|---|---|
| Step 4 | | | | |
| Autoclave charge, lbs. | | | | |
| Starter (Composite of Table XII) | 24 | 24 | 24 | 24 |
| Potassium hydroxide (flake) | 0.11 | 0.18 | 0.18 | 0.18 |
| Agitation period to dissolve KOH, hrs. | 1 | 1 | 2 | 1 |
| Reactor temperature to dissolve KOH, ° C(1) | 130 | 130 | 130 | 125 |
| Propylene oxide feed temperature, ° C | 110 | 110 | 110 | 112 |
| propylene oxide, lbs. | 615 | 59 | 58 | 55.5 |
| Pressure, psig max. | 58 | 59 | 46 | 60 |
| Feed time, hours | 14 | 9.5 | 8 | 11 |
| Cookout time, hours | 9 | 6 | 3 | 6.5 |
| Stripping period, hours | — | 3 | 3 | 3 |
| Stripping temperature, ° C | | 110 | 110 | 110 |
| Stripping pressure, mm Hg | | 20 | 20 | 20 |
| Hydroxyl number | | 30.93 | 38.73 | 31.51 |
| Alkalinity, % KOH | | 0.26 | 0.24 | 0.275 |
| Step 5 | | | | |
| ethylene oxide feed, grams | | 1367 | 1925 | 2682 |
| Ethylene oxide feed temperature, ° C | | 110 | 110 | 110 |
| Ethylene oxide feed time, hours | | 0.83 | 0.62 | 2.5 |
| Pressures, psig max. | | 20 | 32 | 29 |
| Cookout period, hours | | 1 | 1 | 1 |
| Stripping period, hours | 1 | 1 | 1 | 1 |
| Stripping temperature, ° C | 110 | 110 | 110 | 110 |
| Stripping pressure, mm Hg | 20 | 15 | 20 | 20 |

TABLE XIII-continued

| | | | | |
|---|---|---|---|---|
| Crude product recovered, lbs. | 74 | 80 | 83 | 75.9 |
| Magnesium Silicate, lbs. | 1.58 | 1.57 | 1.64 | 1.50 |
| Agitation period, hours | 24 | 10 | 12 | 9 |
| Refining temperature, ° C | 91 | 93 | 100 | 92 |
| Ionol added, lbs. | 0.016 | 0.016 | 0.016 | 0.015 |
| Filtration period, hours | 60 | 20 | 15 | 14 |
| Filtrate recovered, lbs. | 68.3 | 74.4 | 75.8 | 64.8 |
| Stripping period hours | 3 | 3 | 3 | 3 |
| Stripping temperature, ° C | 99 | 100 | 100 | 95 |
| Stripping pressure, mm Hg | 7 | 5 | 5 | 3 |
| Refined Product recovered, lbs. | 64.8 | 70.7 | 72.2 | 56.8 |

| Example | 17 | 18 | 19 | 20 |
|---|---|---|---|---|
| Step 4 | | | | |
| Autoclave charge, lbs. | | | | |
| Starter (Composite of Table XI) | 30 | 30 | 30 | 30 |
| Potassium hydroxide (flake) | 0.11 | 0.16 | 0.16 | 0.16 |
| Agitation period to dissolve KOH, hours | 1 | 2 | 1 | 2 |
| Reactor temperature to dissolve KOH ° C(1) | 130 | 130 | 130 | 130 |
| Propylene oxide feed temperature, ° C | 110 | 110 | 110 | 110 |
| Propylene oxide, lbs. | 54.5 | 54.5 | 56.0 | 56 |
| Pressure, psig max. | 60 | 36 | 62 | 51 |
| Feed time, hours | 13 | 11 | 17.5 | 9.5 |
| Cookout time, hours | 6 | 2 | 5 | 5 |
| Stripping period, hours | | 3 | 3 | 3 |
| Stripping temperature, ° C | | 110 | 110 | 110 |
| Stripping pressure, mm Hg | | 7 | 20 | 20 |
| Hydroxyl number | | 34.22 | | 35.8 |

TABLE XIII-continued

| | | | | |
|---|---|---|---|---|
| Alkalinity, % KOH | | 0.263 | | 0.166 |
| Step 5 | | | | |
| Ethylene oxide feed, grams | | 1176 | 2024 | 2803 |
| Ethylene oxide feed temperature, ° C | | 110 | 110 | 110 |
| Ethylene oxide feed time, hours | | 0.5 | 0.5 | 0.7 |
| Pressures, psig max. | | 24 | 14 | 24 |
| Cookout period, hours | | 1 | 1 | 1 |
| Stripping period, hours | | 1 | 1 | 1 |
| Stripping temperature, °0 C | | 110 | 110 | 110 |
| Stripping pressure, mm Hg | | 20 | 20 | 20 |
| Crude product recovered, lbs. | 83.1 | 78.5 | 76 | 82.5 |
| Magnesium Silicate, lbs. | 1.70 | 1.45 | 1.5 | 1.65 |
| Agitation period, hours | 8 | 8 | 8 | 8 |
| Refining temperature, ° C | 89 | 94 | 100 | 100 |
| Ionol added, lbs. | 0.017 | | .015 | 0.16 |
| Filtration period, hours | 19 | 34 | 16 | 30 |
| Filtrate recovered, lbs. | 80.9 | 75 | 71.5 | 72 |
| Stripping period, hours | 3 | 4 | 3 | 3 |
| Stripping temperature, ° C | 100 | 100 | 100 | 100 |
| Stripping pressure, mm Hg | 7 | 5 | <10 | 5 |
| Refined Product recovered, lbs. | 73.9 | 73.1 | 67.5 | 70.5 |

(1)Sparged nitrogen up through unit to keep KOH suspended.

TABLE XIV

| | Properties of Polyols | | | |
|---|---|---|---|---|
| Example | 13 | 14 | 15 | 16 |
| Product analysis: | | | | |
| Hydroxyl number | 29.27 | 30.57 | 29.24 | 29.11 |
| Acid number | 0.004 | 0.004 | 0.004 | 0.005 |
| Water, % | 0.02 | 0.02 | 0.01 | 0.02 |
| Total alkalinity, meq/gm | 0.00009 | 0.00006 | 0.00011 | 0.00011 |
| Viscosity, cks at 25° C | 1456 | 1478 | 1552 | 1522 |
| Primary hydroxyl, mole-% | 0 | 45 | 58 | 67 |
| Average functionality | 4.6 | 4.35 | 4.17 | 4.15 |
| Oxyethylene, % | 0 | 3.5 | 3.3* | 6.2 |
| Unsaturation, meq/gm | 0.071 | 0.071 | 0.082 | 0.079 |
| Example | 17 | 18 | 19 | 20 |
| Product analysis: | | | | |
| Hydroxyl number | 34.33 | 34.01 | 35.88 | 32.78 |
| Acid number | 0.003 | 0.007 | 0.008 | 0.006 |
| Water, % | 0.02 | 0.01 | 0.02 | 0.03 |
| Total alkalinity, meq/gm | 0.00013 | 0.00010 | 0.00002 | 0.00007 |
| Viscosity, cks at 25° C | 1293 | 1359 | 1202 | 1342 |
| Primary hydroxyl, mole-% | 0 | 39 | 38* | 59 |
| Average functionality | 4.76 | 4.59 | 4.61 | 4.71 |
| Oxyethylene, % | 0 | 1.8* | 3.1* | 4.7* |
| Unsaturation, meq/gm | 0.053 | 0.057 | 0.041 | 0.053 |

*These values are believed to be in error (i.e., too low).

TABLE XV

| | Preparation of Polymer/Polyols | | | | | |
|---|---|---|---|---|---|---|
| Polyol of Example | 9 | 10 | 11 | 12 | 13 | 14 |
| Average Functionality# | 4.04 | 4.37 | 4.86 | 4.38 | 4.6 | 4.35 |
| Primary Hydroxyl, mole-%# | 67 | 67 | 57 | 53 | 0 | 45 |
| Oxyethylene, %# | 7 | 7 | 7 | 4.8 | 0 | 3.5 |
| Reaction Temperature, ° C | 120 | 120 | 120 | 120 | 120 | 120 |
| Residence Time, min. | 12 | 12 | 12 | 12 | 12 | 12 |
| Monomer + VAZO Content in Feed, % | 23.2 | 23.2 | 23.5 | 23.3 | 23.4 | 23.2 |
| VAZO Conc., % in Total Feed | 0.40 | 0.40 | 0.41 | 0.41 | 0.41 | 0.40 |
| Ratio of Acrylonitrile to Styrene in Feed, by wt. | 80/20 | 80/20 | 80/20 | 80/20 | 78/22 | 78/22 |
| Polyol Feed Rate, gm/hr. | 2131 | 2132 | 2158 | 2124 | 2122 | 2143 |
| Monomer + VAZO Feed Rate, gm/hr | 643 | 645 | 663 | 646 | 650 | 648 |
| | 2767 | 2762 | 2801 | 2764 | 2764 | 2785 |
| Product weight, gm/hr. | 15218 | 9668 | 9802 | 13683 | 12438 | 14745 |
| Material Balance, % | 99.7 | 99.5 | 99.3 | 99.9 | 99.8 | 99.8 |
| Residual Acrylonitrile, % | 1.71 | 1.73 | 1.80 | 1.55 | 1.36 | 1.50 |
| Styrene, % | 0.28 | 0.30 | 0.22 | 0.23 | 0.27 | 0.27 |
| TMSN, % | 0.21 | 0.15 | 0.15 | 0.20 | 0.19 | 0.22 |
| Conversions, Acrylonitirle, % | 90.6 | 90.6 | 90.3 | 91.6 | 92.4 | 91.6 |
| Styrene, % | 93.9 | 93.5 | 95.3 | 95.0 | 94.7 | 94.6 |
| Combined, % | 91.3 | 91.1 | 91.3 | 92.3 | 92.9 | 92.3 |

#Analytical

TABLE XVI

| | Preparation of Polymer/Polyols | | | | | |
|---|---|---|---|---|---|---|
| Polyol of Example | 15 | 16 | 17 | 18 | 19 | 20 |
| Average Functionality# | 4.17 | 4.15 | 4.76 | 4.59 | 4.61 | 4.71 |
| Primary Hydroxyl, mole-%# | 58 | 67 | 0 | 39 | 38* | 59 |
| Oxyethylene, %# | 3.3* | 6.2 | 0 | 1.8* | 3.1* | 4.7* |
| Reaction Temperature, ° C | 120 | 120 | 120 | 120 | 120 | 120 |
| Residence Time, min. | 12 | 12 | 12 | 12 | 12 | 12 |
| Monomer + VAZO Content in Feed, % | 23.3 | 23.1 | 23.3 | 23.4 | 23.5 | 33.3 |
| VAZO Conc., wt. % in Total Feed | 0.40 | 0.40 | 0.40 | 0.41 | 0.41 | 0.40 |
| Ratio of Acrylonitrile to Styrene in Feed, by wt. | 78/22 | 78/22 | 78/22 | 78/22 | 78/22 | 78/22 |
| Polyol Feed Rate, gm/hr. | 2137 | 2144 | 2127 | 2113 | 2110 | 2120 |
| Monomer + VAZO Feed Rate, gm/hr | 650 | 645 | 646 | 645 | 646 | 643 |
| | 2796 | 2781 | 2766 | 2747 | 2748 | 2754 |
| Product weight, gm/hr. | 16610 | 12531 | 13971 | 15195 | 14797 | 15147 |
| Material Balance, % | 100.3 | 99.7 | 99.8 | 99.7 | 99.7 | 99.7 |
| Residual Acrylonitrile % | 1.47 | 1.49 | 1.68 | 1.58 | 1.71 | 1.72 |
| Styrene, % | 0.30 | 0.29 | 0.39 | 0.35 | 0.39 | 0.35 |
| TMSN, % | 0.16 | 0.21 | 0.24 | 0.20 | 0.18 | 0.18 |
| Conversion, Acrylonitrile, % | 91.7 | 91.6 | 90.6 | 91.2 | 90.5 | 90.4 |
| Styrene, % | 94.0 | 94.2 | 92.3 | 93.1 | 92.3 | 93.1 |
| Combined, % | 92.2 | 92.2 | 91.0 | 91.6 | 90.9 | 91.0 |

*These values believed to be in error (i.e., too low).
#analytical

TABLE XVII

| Polymer/Polyol From Polyol of Example | Properties of Polymer/Polyols 9 | 10 | 11 | 12 | 13 | 14 |
|---|---|---|---|---|---|---|
| Stripped Product Properties | | | | | | |
| Total Poly A by Calc., % | 16.86 | 16.88 | 17.03 | 17.10 | 16.89 | 16.59 |
| Total Poly S by Calc., % | 4.37 | 4.35 | 4.49 | 4.43 | 4.88 | 4.84 |
| Total Polymer by Calc., % | 21.23 | 21.23 | 21.52 | 21.53 | 21.77 | 21.43 |
| Viscosity at 25° C. Hoeppler, cps. | 4632 | 3676 | 3172 | 3765 | — | — |
| Brookfield, cps. | — | — | — | 3890 | 3240 | 3400 |
| Hydroxyl No.: Calculated | 21.06 | 23.47 | 25.99 | 23.39 | 22.90 | 24.02 |
| Measured | 20.45 | 23.15 | 25.43 | 22.95 | 22.51 | 23.68 |
| Water, % | 0.03 | 0.02 | 0.01 | 0.01 | 0.03 | 0.02 |
| Styrene After Stripping, % | | | | | 0.03 | — |
| 150 Mesh Screen, % Thru | 150 | 100 | 100 | 100 | 100 | 100 |
| Solids on screen, ppm | 7 | 3 | 3 | 5 | 4 | 4 |
| 700 Mesh Screen, time, sec. | 280 | 238 | 228 | 223 | 262 | 269 |
| % Thru | 100 | 100 | 100 | 100 | 100 | 100 |
| Solids on Screen, ppm | 12 | 9 | 15 | 10 | 6 | 7 |
| Centrifugible Solids | 1.67 | 1.61 | 1.65 | 1.67 | 1.78 | 1.71 |
| Light transmission, % | — | — | — | 77.5 | — | — |

TABLE XVIII

| Polymer/Polyol From Polyol of Example | Properties of Polymer/Polyols 15 | 16 | 17 | 18 | 19 | 20 |
|---|---|---|---|---|---|---|
| Stripped Product Properties | | | | | | |
| Total Poly A by Calc., % | 16.69 | 16.54 | 16.52 | 16.67 | 16.61 | 16.46 |
| Total Poly S by Calc., % | 4.82 | 4.80 | 4.74 | 4.80 | 4.78 | 4.78 |
| Total Polymer by Calc., % | 21.51 | 21.34 | 21.26 | 21.47 | 21.39 | 21.24 |
| Viscosity at 25° C. Hoeppler, cps. | — | — | — | — | — | — |
| Brookfield, cps. | 3,750 | 3,600 | 3,100 | 3,150 | 2,740 | 3.070 |
| Hydroxyl No.: Calculated | 22.95 | 22.90 | 27.03 | 26.71 | 28.21 | 25.82 |
| Measured | 22.62 | 22.91 | 26.15 | 25.86 | 27.18 | 25.56 |
| Water, % | 0.02 | 0.03 | 0.01 | 0.03 | 0.02 | 0.03 |
| Styrene After Stripping, % | 0.04 | 0.04 | 0.04 | 0.04 | 0.03 | 0.03 |
| 150 Mesh Screen, % Thru | 100 | 100 | 100 | 100 | 100 | 100 |
| Solids on screen, ppm | 1 | 3 | 4 | 16 | 6 | 9 |
| 700 Mesh Screen, time, sec. | 277 | 280 | 258 | 227 | 248 | 236 |
| % Thru | 100 | 100 | 100 | 100 | 100 | 100 |
| Solids on Screen, ppm | 9 | 8 | 3 | 9 | 10 | 26 |
| Centrifugible Solids | 1.88 | 1.70 | 1.70 | 1.83 | 1.84 | 1.62 |
| Light Transmission, % | — | — | — | — | — | — |

TABLE XIX

SUMMARY OF PROPERTIES OF SORBITOL STARTED POLYOLS AND POLYMER/POLYOLS VARYING ETHYLENE OXIDE CONTENTS

| Polyols of Example | 13 | 14 | 15 | 16 |
|---|---|---|---|---|
| Hydroxyl Number, # | 29.3 | 30.6 | 29.2 | 29.1 |
| Oxyethylene Content, %* | 0 | 3 | 5 | 7 |
| Primary Hydroxyls, mole-% # | 0 | 45 | 58 | 67 |
| Average Functionality # | 4.60 | 4.35 | 4.17 | 4.15 |
| Viscosity, cks at 25° C | 1456 | 1478 | 1552 | 1552 |

TABLE XIX-continued

SUMMARY OF PROPERTIES OF SORBITOL STARTED POLYOLS AND POLYMER/POLYOLS VARYING ETHYLENE OXIDE CONTENTS

| Polymer/Polyols | | | | |
|---|---|---|---|---|
| Hydroxyl Number # | 22.5 | 23.7 | 22.6 | 22.9 |
| VCN/STY Ratio | 79/21 | 79/21 | 79/21 | 79/21 |
| Viscosity, cps at 25° C | 3240 | 3400 | 3750 | 3600 |

#Analytical
Target

TABLE XX

Preparation of Polyurethane Foam (Variation of $C_2H_4O$ at OH No. of 30)

| Polyol of Example | 13 | 13 | 14 | 14 | 14 | 12 | 15 | 16 |
|---|---|---|---|---|---|---|---|---|
| Polyol OH No. # | 29.3 | 29.3 | 30.6 | 30.6 | 30.6 | 29.8 | 29.2 | 29.1 |
| Polyol $C_2H_4O$ Content, %* | 0 | 0 | 3 | 3 | 3 | 5 | 5 | 7 |
| Formulations, pbw | | | | | | | | |
| Polyol | 60 | | | | | | | |
| Polymer-Polyol** | 40 | | | | | | | |
| Water | 2.6 | | | | | | | |
| Amine Catalyst I | 0.10 | → | → | → | → | → | → | → |
| Amine Catalyst II | 0.30 | | | | | | | |
| Amine Catalyst III | 0.30 | | | | | | | |
| Dibutyltindilaurate | 0.05 | 0.10 | 0.03 | 0.03 | 0.03 | 0.03 | 0.03 | 0.03 |
| Silicone I | 2.0 | 5.0 | 1.7 | 2.0 | 3.0 | 1.7 | 1.7 | 1.7 |
| Isocyanate I | 105 Index | → | → | → | → | → | → | → |
| Remarks | Collapsed | | Voids and Coarse Cells | Voids | Partial Voids and Shrinking | Good | Good | Good |
| Physical Properties | | | | | | | | |
| Density, overall, pcf | | | | | | 2.93 | 3.00 | 3.03 |
| core, pcf | | | | | | 2.64 | 2.88 | 2.83 |
| Porosity, $ft^3/min/ft^2$ | | | | | | 36.0 | 31.8 | 26.7 |
| Resiliency, % ball rebound | | | | | | 69 | 66 | 66 |
| ILD(lbs/50 $in^2$) | | | | | | | | |

TABLE XX-continued

| | Preparation of Polyurethane Foam (Variation of $C_2H_4O$ at OH No. of 30) | | | | | | | |
|---|---|---|---|---|---|---|---|---|
| Polyol of Example | 13 | 13 | 14 | 14 | 14 | 12 | 15 | 16 |
| Polyol OH No. # | 29.3 | 29.3 | 30.6 | 30.6 | 30.6 | 29.8 | 29.2 | 29.1 |
| Polyol $C_2H_4O$ Content, %* | 0 | 0 | 3 | 3 | 3 | 5 | 5 | 7 |
| 25% | | | | | | 40.2 | 39.9 | 48.3 |
| 65% | | | | | | 102.0 | 103.9 | 123.5 |
| 25% Return, % | ← | NOT | TESTED | → | | 83.1 | 83.4 | 82.6 |
| Load Ratio | | | | | | 2.54 | 2.60 | 2.56 |
| Tensile Strength, psi | | | | | | 15.2 | 14.2 | 15.5 |
| Elongation, percent | | | | | | 104 | 102 | 98 |
| Tear Resistance, pli | | | | | | 0.98 | 0.94 | 0.80 |
| 75% Compression Set, % | | | | | | 7.3 | 6.1 | 6.0 |
| Humid Aging (5 hours at 120° C) | | | | | | | | |
| 50% Compression Set, % | | | | | | 12.7 | 10.9 | 11.7 |
| Load Loss, % | | | | | | 8.0 | 9.5 | 7.8 |
| Rate of Stress Relaxation −ΔILD/log time | | | | | | 0.065 | — | — |

#Analytical
*Target
**Made from polyol listed in same column; preparation summarized in Tables XV and XVI.

TABLE XXI

| | Preparation of Polyurethane Foam (Variation of $C_2H_4O$ in Polyol at OH No. of 34) | | | |
|---|---|---|---|---|
| Polyol of Example | 17 | 18 | 19 | 20 |
| Polyol OH No. # | 34.3 | 34.0 | 35.9 | 32.8 |
| Oxyethylene Content, %* | 0 | 3 | 5 | 7 |
| Formulations, pbw | | | | |
| Polyol | 60 | | | |
| Polymer/Polyol** | 40 | | | |
| Water | 2.6 | | | |
| Amine Catalyst I | 0.1 | → | → | → |
| Amine Catalyst II | 0.3 | | | |
| Amine Catalyst III | 0.3 | | | |
| Dibutyltindilaurate | 0.03 | | | |
| Silicone 1 | 2.0 | 1.7 | 1.7 | 1.7 |
| Isocyanate 1 | 105 Index | → | → | → |
| Remarks | Collapsed | Voids | Good | Good |
| Mold Exit Time, sec. | — | 70 | 65 | 64 |
| Physical Properties | | | | |
| Density, Overall, pcf | | 3.01 | 3.03 | 3.00 |
| Core, pcf | Not | 2.67 | 2.73 | 2.65 |
| Porosity, $ft^3/min/ft^2$ | | 29.2 | 24.0 | 20.8 |
| Resiliency, % ball rebound | | 66 | 65 | 67 |
| ILD (lbs/50 $in^2$) | | | | |
| 25% | Tested | 44.2 | 47.2 | 46.1 |
| 65% | | 110.7 | 119.0 | 113.0 |
| 25% Return | | 84.2 | 84.0 | 84.5 |
| Load Ratio | | 2.51 | 2.52 | 2.45 |
| Tensile Strength, psi | | 13.1 | 15.6 | 13.6 |
| Elongation, % | | 90 | 90 | 86 |
| Tear Resistance, pli | | 0.71 | 0.77 | 0.69 |
| 75% Compression Set, % | | 5.7 | 6.1 | 6.4 |
| Humid Aging (5 hours at 120° C) | | | | |
| 50% Compression Set, % | | 9.7 | 10.8 | 11.2 |
| 50% CLD Load Loss, % | | 13.8 | 18.9 | 16.6 |
| Rate of Stress Relaxation −ΔILD/log time | | .063 | .064 | .063 |

#analytical
*target
**Made from polyol listed in same column; preparations summarized in Table XVI.

EXAMPLES 21 TO 24

Examples 21 to 24 demonstrate the use of amine starters in producing polyols in accordance with the practice of the present invention. The details of the preparation of the polyol intermediates and the final polyols are shown in Tables XXII and XXIII. The procedures used were similar to those described above for the preparation of polyols from polyhydric alcohol starters. The properties of the amine-started polyols are shown in Table XXIV.

As shown in Table XXV, the physical properties of the molded, high resiliency foams prepared with the amine-started polyols are comparable to those obtained with the polyols of this invention based on hydroxy-containing starter and no significant improvements were observed for either the stress relaxation or humid aging properties. Table XXV also shows that the foams prepared from amine-started polyols were superior to the prior art foams. Since these formulations contained only 60 pbw of the amine-started polyols, further reductions in amine catalysis would be anticipated for formulations based on an additional 40 pbw of the comparable amine-started polymer/polyol (since no polymer/-polyols were made from the amine-started polyols of Examples 22 and 24, polymer/polyols made from hydroxy starters were used in making the foams from the polyols of Examples 22 and 24 as indicated by footnote (b) in Table XXV). Better control of formulation reactivity can probably be achieved by amine catalysis, rather than the inherent catalytic nature of amine-started polyols.

TABLE XXII

| | Preparation of Polyol Intermediates From Amine Starters | | | | |
|---|---|---|---|---|---|
| Example | 21 | 22 | (b) | 23 | 24 |
| Charge, grams | | | | | |
| DETA-PO(a) | 2078 | 1075 | | | |
| Ethylene diamine | | | 825 | | |
| Intermediate From(b) | | | | 1890 | 980 |
| Potassium hydroxide | 20 | 20 | | 20 | 15 |
| Oxide Feed Date | | | | | |
| Propylene oxide, grams | 6188 | 7178 | 3185 | 6311 | 7013 |
| Temperature, ° C | 110 | 110 | 89 | 110 | 110 |
| Pressure, psig max. | 60 | 62 | 30 | 68 | 65 |
| Feed time, hours | 9.5 | 11 | 2.75 | 10.75 | 10.5 |
| Cookout time, hours | 3 | 5.75 | 3 | 6 | 8 |
| Analysis of Crude Product(c) | | | | | |
| Hydroxyl number | 180.8 | 100.5 | | 181.4 | 97.8 |
| Alkalinity, % | | | | | |
| KOH | 0.14 | 0.175 | | 0.199 | 0.169 |

TABLE XXII-continued

| Preparation of Polyol Intermediates From Amine Starters | | | | | |
|---|---|---|---|---|---|
| Example | 21 | 22 | (b) | 23 | 24 |
| Viscosity, cks. at 25° C. | 1008 | 767 | | 713 | 615 |

(a)Polyol intermediate made from one mole of diethylene triamine (DETA) and 6 moles of propylene oxide (PO). DETA was also the catalyst.
(b)Preparation of polyol intermediate used in Examples 23 and 24.
(c)Each of the above intermediates were catalyzed and delivered hot to the reactor used to produce final polyol products as tabulated in Table XXIII. It was necessary to use temperatures in excess of 150° C in some cases to dissolve the potassium hydroxide.

TABLE XXIII

| Preparation of Polyols From Amine-Started Intermediates | | | | |
|---|---|---|---|---|
| Example | 21 | 22 | 23 | 24 |
| Autoclave charge, lbs. | | | | |
| Ethylene diamine intermediate | 0 | 0 | 17.87 | 17.4 |
| Diethylene triamine intermediate | 18.07 | 17.8 | 0 | 0 |
| Potassium hydroxide, contained | 0.176 | 0.187 | 0.187 | 0.209 |
| Temperature during propylene oxide feed, ° C | 108–116 | 100–122 | 110 | 100–114 |
| Propylene oxide feed, lbs. | 55 | 55 | 60 | 60 |
| Feed period, hrs. | 6.5 | 9.0 | 6.0 | 6.0 |
| Peak pressure, psig | 54 | 55 | 57 | 48 |
| Cook - out period, hrs. | 3.5 | 3.0 | 3.5 | 2 |
| Final pressure, psig | 3 | 2 | 2 | 2 |
| Hydroxyl number | 53.41 | 35.44 | 49.84 | 34.4 |
| Additional propylene oxide added, lbs. | 7.5 | 16.4 | 2.2 | 11.2 |
| Final hydroxyl number | 49.4 | 31.37 | 50.57 | 30.86 |
| Alkalinity, per cent KOH | 0.256 | 0.252 | 0.235 | 0.247 |
| Stripping temperature, ° C | 116–120 | 120 | 120 | 120 |
| Stripping pressure, mm/Hg | 7–5 | 5 | 7 | 5 |
| Stripping period, hrs. | 3 | 2 | 3 | 3 |
| Ethylene oxide fed, lbs. | 6 | 6.3 | 6.0 | 6.2 |
| Capping temperature, ° C | 108–112 | 110–115 | 110–124 | 110 |
| Feed and cook - out periods, hrs. | 2 | 2 | 2.5 | 2.5 |
| Stripping temperature, ° C | 110 | 110 | 110 | 110 |
| Stripping pressure, mm/Hg | 7 | 4 | 5 | 6–3 |
| Crude product recovered, lbs. | 77 | 79 | 83 | 64(1) |
| Magnesium silicate | 1.54 | 1.58 | 1.66 | 1.28 |
| Agitation period, at 100° C, hrs. | 8 | 8 | 8 | 8 |
| Ionol added, lbs. | 0.0154 | 0.0158 | 0.0166 | 0.0128 |
| Filtered product recovered, lbs. | 67.5 | 76 | 78.5 | 57 |
| Filtration period, hrs. | 13.5 | 17 | 21.5 | 6.0 |
| Final stripping period, hrs. | 3 | 3 | 3 | 3 |
| Autoclave temperature, ° C | 120–99 | 100 | 100 | 100 |
| Autoclave pressure, mm/Hg. | 4 | 5 | 5 | 5 |
| Final product recovered, lbs. | 60.4 | 70.8 | 76.0 | 56.5 |

(1)Estimated 2 gallons lost during transfer spill.

TABLE XXIV

| Properties of Polyols From Amine Starters | | | | |
|---|---|---|---|---|
| Example | 21 | 22 | 23 | 24 |
| Hydroxyl number(a) | 43.92 | 29.36 | 45.51 | 28.72 |
| Water, %(a) | 0.013 | 0.014 | 0.017 | 0.018 |
| Total alkalinity meq/gm(a) | 0.405 | 0.197 | 0.327 | 0.157 |
| Functionality(a) | 4.47 | 3.59 | 3.52 | 3.01 |

TABLE XXIV-continued

| Properties of Polyols From Amine Starters | | | | |
|---|---|---|---|---|
| Example | 21 | 22 | 23 | 24 |
| Primary hydroxyl, mole %(b) | >50 | >50 | >50 | >50 |

(a)Analytical
(b)Estimate; primary hydroxyl not determined but can be determined by NMR derivative method.

TABLE XXV

| PREPARATION OF POLYURETHANES FROM AMINE-STARTED POLYOLS | | | |
|---|---|---|---|
| Polyol from Example | 6 | 22 | 24 |
| Starter | Sorbitol | Diethylene Triamine | Ethylene Diamine |
| Hydroxyl No. (analytical) | 29.1 | 29.4 | 28.7 |
| Average Functionality (analytical) | 4.07 | 3.59 | 3.01 |
| Viscosity, cks at 25° C | 1441 | 1343 | 1251 |
| Formulation, pbw | | | |
| Polyol | 60 | 60 | 60 |
| Polymer/Polyol | 40(a) | 40(b) | 40(b) |
| Water | 2.6 | 2.6 | 2.6 |
| Amine Catalyst I | 0.10 | 0.10 | 0.10 |
| Amine Catalyst II | 0.30 | 0.275 | 0.275 |
| Amine Catalyst III | 0.30 | 0.30 | 0.30 |
| Dibutyltindilaurate | 0.03 | 0.03 | 0.03 |
| Silicone I | 1.7 | 1.7 | 2.0 |
| Isocyanate I | 105 Index | 105 Index | 105 Index |
| Physical Properties | | | |
| Mold Exit Time, sec. | 61 | 55 | 55 |
| Density, Overall, pcf | 3.00 | 2.99 | 2.97 |
| Core, pcf | 2.84 | 2.84 | 2.86 |
| Porosity, $ft^3/min/ft^2$ | 23.0 | 24.0 | 26.0 |
| Resiliency, % ball rebound | 66 | 65 | 66 |

TABLE XXV-continued

| PREPARATION OF POLYURETHANES FROM AMINE-STARTED POLYOLS | | | |
|---|---|---|---|
| Polyol from Example | 6 | 22 | 24 |
| ILD(lbs/50 in$^2$) | | | |
| 25% | 43.7 | 40.7 | 42.0 |
| 65% | 118.0 | 103.2 | 108.0 |
| 25% Return | 84.7 | 83.0 | 83.4 |
| Load Ratio | 2.70 | 2.54 | 2.58 |
| Tensile Strength, psi | 19.3 | 19.6 | 23.5 |
| Elongation, % | 121 | 128 | 155 |
| Tear Resistance, pli | 1.12 | 1.55 | 1.84 |
| 75% Compression Set, % | 7.5 | 8.5 | 7.5 |
| Humid-Aging (5 hours at 120° C) | | | |
| 50% Compression Set, % | 13.5 | 16.1 | 15.9 |
| Load Loss, % | 5.5 | 4.1 | 9.7 |
| Rate of Stress Relaxation | | | |
| $-\Delta$ILD/log time | .066 | .068 | .068 |

[a]Made as described above from the polyol of Example 6.
[b]Made as described above from the polyol of Example 1.

EXAMPLE 25

A polyol was prepared essentially the same in composition as Polyol I but having 93% oxypropylene groups and 7% oxyethylene groups. Large scale foam preparations using this polyol and Polymer/Polyol I yielded foams having poor demold properties using a formulation as in Table VII.

EXAMPLES 26 TO 33

A comparison was made of molded and free rise high resiliency polyurethane foams made from a polyols of this invention as the sole polyol component and from other polyols and polymer/polyols. The formulations and foam properties are shown in Table XXVI.

As is shown by the data in Table XXVI, acceptable molded foams were prepared with the novel Polyol of Example 12 as the sole polyol component using Silicone II for cell stabilization and carbon black to open the cells. Compared to prior art Polymer/Polyol I, this foam exhibited about 25 percent lower loads, improved humid aging values and superior stress relaxation properties. However, the use of this polyol as the sole polyol component results in reduced tensile strength and tear resistance values which can be improved by using this polyol in combination with a polymer/polyol of this invention as shown in Example 27.

As is also shown by the data in Table XXVI, free-rise foams prepared with Silicone I were closed and shrank very badly. Lower levels of Silicone I (not shown in Table XXVI) produce foams with poor cell stabilization. Use of Silicone II provided free-rise foams which did not shrink nearly as much as those based on Silicone I. The foam prepared with the novel polyol of Example 12 as the sole polyol component exhibited only slight signs of shrinkage. Addition of "Coloidex No. 3 Carbon Black" (1.0 pbw) produced foams with even more open-cell character. In all cases, the foams prepared with the novel Polyol of Example 12 as the sole polyol component were rated significantly better than those based on prior art Polyol I as the sole polyol component. Similar studies (not shown in Table XXVI) with prior art Polyol II showed such foams to shrink even more than foams based on Polyol I.

TABLE XXVI

| PREPARATION OF POLYURETHANE FOAMS (WITH AND WITHOUT POLYMER/POLYOL) | | | | |
|---|---|---|---|---|
| Example | 26 | 27 | 28 | 29 |
| Formulations, pbw | | | | |
| Polyol 1[1] | 60 | — | 100 | — |
| Polymer/Polyol 1[2] | 40 | — | — | — |
| Polyol of Example 12 | — | 60 | — | 100 (5) |
| Polymer/Polyol of Example 12(3) | — | 40 | — | — |
| Water | 2.6 | 2.6 | 2.6 | 2.6 |
| Amine Catalyst I | 0.10 | 0.10 | 0.10 | 0.10 |
| Amine Catalyst II | 0.36 | 0.30 | 0.30 | 0.30 |
| Amine Catalyst III | 0.30 | 0.30 | 0.30 | 0.30 |
| Dibutyltindilaurate | 0.015 | 0.03 | 0.03 | 0.03 |
| Silicone 1 | 1.7 | 1.7 | 1.7 | 1.7 |
| Silicone II | — | — | — | — |
| "Coloidex No. 3"Carbon Black | — | — | — | — |
| Isocyanate I | 105 Index | 105 Index | 105 Index | 105 Index |
| Free-Rise Foams:[4] | | | Very | Very |
| Remarks | No Shrinkage | Bad | Bad Shrink | Shrink |
| Physical Properties | | | | |
| Density, Overall, pcf | 3.00 | 2.93 | 2.93 | 3.03 |
| Core, pcf | 2.68 | 2.64 | 2.63 | 2.70 |
| Porosity, ft$^3$/min/ft$^2$ | 16.1 | 36.0 | 14.8 | 31.9 |
| Resiliency, % ball rebound | 62 | 69 | 56 | 66 |
| ILD (lbs/50 in$^2$) | | | | |
| 25% | 43.1 | 40.2 | 27.0 | 30.2 |
| 65% | 114.0 | 102.0 | 73.0 | 76.9 |
| 25% Return | 81.0 | 83.1 | 82.8 | 85.0 |
| Load Ratio | 2.65 | 2.54 | 2.71 | 2.55 |
| Tensile Strength, psi | 23.5 | 15.2 | 19.9 | 12.8 |
| Elongation, % | 151 | 104 | 188 | 113 |
| Tear Resistance, pli | 1.82 | 0.98 | 1.52 | 0.70 |
| 75% Compression Set, % | 7.8 | 7.3 | 14.8 | 8.6 |
| Humid Aging (5 hours at 120° C) | | | | |
| 50% Compression Set, % | 18.9 | 12.7 | 24.3 | 12.0 |

TABLE XXVI-continued

| PREPARATION OF POLYURETHANE FOAMS (WITH AND WITHOUT POLYMER/POLYOL) | | | | |
|---|---|---|---|---|
| 50% CLD Load Loss, % | 25.3 | 8.0 | 27.0 | 7.7 |
| Rate of Stress Relaxation | | | | |
| −ΔILD/log time | .072 | .065 | — | — |
| Flammability, ASTM D1692 | | | | |
| Burn Extent, inches | — | — | — | — |
| Burn Rate, in/min | — | — | — | — |
| Example | 30 | 31 | 32 | 33 |
| Formulations, pbw | | | | |
| Polyol I[1] | 100 | — | 100 | — |
| Polymer/Polyol I[2] | — | — | — | — |
| Polyol of Example 12 | — | 100[5] | — | 100[5] |
| Polymer/Polyol of Example 12[3] | — | — | — | — |
| Water | 2.6 | | | |
| Amine Catalyst I | 0.10 | | | |
| Amine Catalyst II | 0.30 | → | → | → |
| Amine Catalyst III | 0.30 | | | |
| Dibutyltindilaurate | 0.03 | | | |
| Silicone I | — | — | — | — |
| Silicone II | 0.02 | 0.02 | 0.02 | 0.02 |
| "Coloidex No. 3" Carbon Black | — | — | 1.0 | 1.0 |
| Isocyanate I | 105 | Index → | → | → |
| Free-Rise Foams:[4] | Bad | Slight | Slight | Good |
| Remarks | Shrink | Shrink | Shrink | |
| Physical Properties | | | | |
| Density, Overall, pcf | 3.01 | 3.02 | 3.02 | 3.03 |
| Core, pcf | 2.42 | 2.61 | 2.62 | 2.65 |
| Porosity, $ft^3/min/ft^2$ | 65.5 | 78.0 | 68.3 | 77.5 |
| Resiliency, % ball rebound | 67 | 70 | 67 | 72 |
| ILD ($lbs/50\ in^2$) | | | | |
| 25% | 28.4 | 30.9 | 29.0 | 31.1 |
| 65% | 72.4 | 79.4 | 75.0 | 80.0 |
| 25% Return | 84.4 | 85.8 | 82.8 | 85.2 |
| Load Ratio | 2.55 | 2.57 | 2.59 | 2.57 |
| Tensile Strength, psi | 15.0 | 12.7 | 18.8 | 12.2 |
| Elongation, % | 162 | 121 | 188 | 116 |
| Tear Resistance, pli | 1.50 | 0.70 | 1.79 | 0.82 |
| 75% Compression Set, % | 8.5 | 6.3 | 7.4 | 5.4 |
| Humid Aging (5 hours at 120° C) | | | | |
| 50% Compression Set, % | 13.9 | 8.1 | 13.8 | 8.6 |
| 50% CLD Load Loss, % | 27.3 | 10.5 | 27.9 | 9.1 |
| Rate of Stress Relaxation | | | | |
| −ΔILD/log time | — | — | .065 | .056 |
| Flammability, ASTM D1692 | | | | |
| Burn Extent, inches | — | — | 5.0 | 5.0 |
| Burn Rate, in/min | — | — | 3.4 | 4.4 |

[1] Commercially available prior art polyol described above.
[2] Commercially available prior art polymer/polyol described above.
[3] Polymer/polyol of this invention produced as described above from the polyol of Example 12.
[4] All other properties are for molded foams. The same formulations were used for both the molded and free-rise foams.
[5] Polyol made as in Example 12 but on a larger scale.

EXAMPLES 34 TO 37

Another comparison was made of molded, high resiliency polyurethane foams made from a polyol of this invention as the sole polyol component and from other polyol and polymer/polyols. In these Examples a formulation was used having less water than the formulation used in Examples 25 to 33 and would be expected to produce foams having better stress relaxation and poorer humid aging load loss properties. The results are shown in Table XXVII and support the conclusion drawn above from the results shown in Table XXVI concerning the utility of the polyol of Example 12 as the sole polyol component.

TABLE XXVII

| PREPARATION OF POLYURETHANE FOAMS (WITH AND WITHOUT POLYMER/POLYOL) | | | | |
|---|---|---|---|---|
| Example | 34 | 35 | 36 | 37 |
| Formulations, pbw | | | | |
| Polyol I[1] | 60 | — | 100 | — |
| Polymer/Polyol I[2] | 40 | — | — | — |
| Polyol of Example 12 | — | 60 | — | 100(4) |
| Polymer/Polyol of Example 12[3] | — | 40 | — | — |
| Water | 2.0 | | | |
| Amine Catalyst I | 0.10 | | | |
| Amine Catalyst II | 0.30 | | | |
| Amine Catalyst III | 0.30 | | | |
| Dibutyltindilaurate | 0.03 | → | → | → |
| Silicone I | 1.7 | | | |
| Trichloromonofluoromethane | 5.0 | | | |
| Isocyanate I, Index | 105 | | | |
| Molded Foam: | Shrink | Slight | Very | Bad |
| Remarks | | Shrink | Bad Shrink | Shrink |
| Physical Properties | | | | |
| Density, Overall, pcf | 3.11 | 3.12 | 3.03 | 3.03 |
| Core, pcf | 2.72 | 2.83 | 2.78 | 2.78 |

TABLE XXVII-continued

| PREPARATION OF POLYURETHANE FOAMS (WITH AND WITHOUT POLYMER/POLYOL) | | | | |
|---|---|---|---|---|
| Example | 34 | 35 | 36 | 37 |
| Porosity, $ft^3/min/ft^2$ | 15.5 | 29.2 | 17.1 | 33.5 |
| Resiliency, % ball rebound | 58 | 66 | 53 | 65 |
| ILD ($lbs/50\ in^2$) | | | | |
| 25% | 32.2 | 29.0 | 20.0 | 23.6 |
| 65% | 85.0 | 77.7 | 60.0 | 62.5 |
| 25% Return | 83.3 | 85.5 | 84.5 | 86.0 |
| Load Ratio | 2.64 | 2.68 | 3.00 | 2.65 |
| Tensile Strength, psi | 19.9 | 11.1 | 14.2 | 8.4 |
| Elongation, % | 173 | 107 | 161 | 98 |
| Tear Resistance, pli | 1.71 | 0.74 | 1.03 | 0.44 |
| 75% Compression Set, % | 9.6 | 8.0 | 14.4 | 8.9 |
| Humid Aging (5 hours at 120° C) | | | | |
| 50% Compression Set, % | 20.3 | 12.8 | 24.1 | 10.1 |
| 50% CLD Load Loss, % | 42.1 | 15.5 | 40.6 | 21.0 |
| Rate of Stress Relaxation | | | | |
| −ΔILD/log time | .065 | .057 | — | — |

(1) Commercially available prior art polyol described above.
(2) Commercially available prior art polymer/polyol described above.
(3) Polymer/polyol of this invention produced as described above from the polyol of Example 12.
(4) Polyol made as in Example 12 but on a larger scale.

EXAMPLES 38 TO 41

Experiments were conducted to determine whether or not the addition of a crosslinker (triethanol amine) to a formulation containing a prior art polyol and a prior art polymer/polyol would result in polyurethane foams of improved humid aging and stress relaxation properties. The results of these experiments are shown in Table XXVIII. The results show that the formulations containing the crosslinker resulted in foams having poorer humid aging compression set.

TABLE XXVIII

| EFFECT OF TRIETHANOLAMINE (TEOA) ON HR FOAM PROPERTIES | | | | |
|---|---|---|---|---|
| Example | 38 | 39 | 40 | 41 |
| Formulations, plow | | | | |
| Polyol I | 60 | | | |
| Polymer/Polyol I | 40 | | | |
| Water | 2.8 | | | |
| Amine Catalyst I | 0.08 | | | |
| Triethylene Diamine (Solid) | 0.08 | → | → | → |
| N-Ethylmorpholine | 0.80 | | | |
| Dibutyltindilaurate | 0.03 | | | |
| Silicone I | 1.5 | | | |
| TEOA | — | | | |
| Isocyanate I | 105 Index → | → | → | |
| Mold Exit Time, secs. | 68 | 56 | 53 | 40 |
| Physical Properties | | | | |
| Density, overall, pcf | 2.77 | 2.82 | 2.93 | 3.13 |
| core, pcf | 2.58 | 2.51 | 2.53 | 2.63 |
| Resliency, | | | | |
| Resiliency, ball rebound | 63 | 63 | 63 | 64 |
| 25% | 27.2 | 27.6 | 29.8 | 33.4 |
| 65% | 72.6 | 76.1 | 84.8 | 102.3 |
| Load Ratio | 2.67 | 2.76 | 2.92 | 3.07 |
| Tensile Strength, psi | 22.7 | 18.8 | 18.9 | 17.6 |
| Elongation, % | 170 | 133 | 126 | 102 |
| Tear Resistance, pli | 2.2 | 1.6 | 1.4 | 1.0 |
| 75% Compression Set, % | 9.4 | 9.4 | 8.7 | 8.1 |
| Humid Aging (5 hours at 120° C) | | | | |
| 50% Compression Set, % | 20.0 | 24.3 | 25.0 | 27.2 |
| CLD Load Loss, % | 34.7 | 31.5 | 28.3 | 28.6 |

EXAMPLES 42 TO 47

Experiments were conducted to determine whether or not decreasing the TDI to AFPI ratio would result in polyurethane foams of improved humid aging and stress relaxation properties in a formulation containing a prior art polyol and a prior art polymer/polyol. To this end isocyanates having various TDI to AFPI ratios were employed. The results are shown in Tables XXIX and XXX and indicate no improvement in stress relaxation properties when the functionality of the isocyanate is increased.

TABLE XXIX

| EFFECT OF TDI/AFPI RATIOS ON HR FOAM PROPERTIES | | | | | | |
|---|---|---|---|---|---|---|
| Example | 42 | 43 | 44 | 45 | 46 | 47 |
| Polyol I | 60 | → | → | → | → | → |
| Polymer/Polyol I | 40 | → | → | → | → | → |
| Water | 2.6 | → | → | → | → | → |
| Amine Catalyst I | 0.87 | 0.10 | 0.13 | 0.136 | 0.15 | 0.17 |
| Amine Catalyst II | 0.32 | 0.36 | 0.48 | 0.49 | 0.53 | 0.60 |
| Amine Catalyst III | 0.26 | 0.30 | 0.40 | 0.41 | 0.44 | 0.50 |
| Dibutyltindilaurate | 0.015 | → | → | → | → | → |
| Silicone I | 1.5 | → | → | → | → | → |

TABLE XXIX-continued

EFFECT OF TDI/AFPI RATIOS ON HR FOAM PROPERTIES

| Example | 42 | 43 | 44 | 45 | 46 | 47 |
|---|---|---|---|---|---|---|
| Isocyanate Ratio (100 Index) | | | | | | |
| TDI | 100 | 80* | 60 | 40 | 20 | 0 |
| AFPI | 0 | 20* | 40 | 60 | 80 | 100 |
| Mold Exit Time, secs. | 64 | 65 | 74 | 110 | 110 | 104 |
| Physical Properties | | | | | | |
| Density, overall pcf | 2.97 | 3.02 | 2.98 | 3.02 | 3.03 | 3.03 |
| core, pcf | 2.52 | 2.39 | 2.46 | 2.47 | 2.45 | 2.48 |
| ILD (lbs/50 $in^2$) | | | | | | |
| 25% | 52.5 | 32.8 | 25.7 | 28.7 | 33.2 | 34.6 |
| 65% | 113.8 | 88.2 | 81.3 | 82.1 | 87.0 | 91.0 |
| Load Ratio | 2.17 | 2.69 | 2.78 | 2.86 | 2.62 | 2.63 |
| Tensile Strength, psi | 22.4 | 22.6 | 16.4 | 14.4 | 13.4 | 11.1 |
| Elongation, % | 200 | 177 | 135 | 107 | 98 | 72 |
| Tear Resistance, pli | 3.6 | 1.8 | 1.2 | 0.9 | 0.7 | 0.5 |
| Compression Set, % | | | | | | |
| 75% | 8.7 | 9.9 | 8.8 | 7.3 | 7.9 | 7.8 |
| 90% | 7.6 | 8.8 | 7.7 | 7.5 | 7.1 | 7.1 |
| Humid Aging (5 hours at 120° C) | | | | | | |
| 50% Compression Set, % | 13.2 | 19.7 | 25.1 | 19.0 | 16.8 | 12.2 |
| Load Loss, % | 31.8 | 21.9 | 29.1 | 34.7 | 25.8 | 17.0 |

*TDI to AFPI ratio used in commercial process of prior art.

TABLE XXX

Effect of TDI/AFPI Ratio on Rate of Stress Relaxation for Molded HR Foams

| Example | 48 | 49 |
|---|---|---|
| Formulation, pbw | | |
| Polyol I | 60 | 60 |
| Polymer/Polyol I | 40 | 40 |
| Water | 2.8 | 2.8 |
| Amine Catalyst I | 0.08 | 0.08 |
| Triethylene diamine (solid) | 0.08 | 0.08 |
| N-Ethyl Morpholine | 0.80 | 0.80 |
| Dibutyltindilaurate | 0.03 | 0.03 |
| Silicone IV | 0.75 | 0.75 |
| TDI/AFPI Ratio (100 Index) | 80/20* | 70/30 |
| Rate of Stress Relaxation | | |
| −ΔILD/log time | 0.074 | 0.077 |

*TDI to AFPI ratio used in commercial process of prior art.

What is claimed is:

1. A polymer/polyol composition consisting essentially of:

A. A major amount of a normally liquid polyoxyalkylene-polyoxyethylene polyol consisting essentially of: (1) polyoxyalkylene blocks that consist of oxyalkylene groups containing at least 3 carbon atoms, (2) polyoxyethylene blocks that consist of oxyethylene groups, that end-block at least 35 mole percent of such polyoxyalkylene blocks and that are terminated with primary hydroxyl groups and (3) the residue of at least one starter, said polyol having: (a) from 90 to 97 weight percent of such polyoxyalkylene blocks and from 10 to 3 weight percent of such polyoxyethylene blocks based on the total weight of such blocks in the polyol, (b) an average of at least 3.2 hydroxyl groups per molecule, (c) a hydroxyl number no greater than 45 and (d) at least 35 mole percent primary hydroxyl groups based on the total moles of hydroxyl groups in the polyol; and B. A minor amount of a polymer formed by polymerizing at least one ethylenically unsaturated monomer in said polyol by free radical polymerization, said polymer being in the form of particles that are stably dispersed in the polyol.

2. An elastomeric polyurethane produced by reacting: (I) a polymer/polyol composition as claimed in claim 1 and (II) an organic polyisocyanate in the presence of (III) a catalyst for the reaction of (I) and (II) to produce the polyurethane.

3. A normally liquid polyoxyalkylene-polyoxyethylene polyol consisting essentially of: (1) polyoxyalkylene blocks that consist of oxyalkylene groups containing at least 3 carbon atoms, (2) polyoxyethylene blocks that consist of oxyethylene groups, that end block at least 35 mole percent of such polyoxyalkylene blocks and that are terminated with primary hydroxyl groups and (3) the residue of at least one starter, said polyol having: (a) from 90 to 97 weight percent of such polyoxyalkylene blocks and from 10 to 3 weight percent of such polyoxyethylene blocks based on the total weight of such blocks in the polyol, (b) an average of at least 3.2 hydroxyl groups per molecule, (c) a hydroxyl number no greater than 45 and (d) at least 35 mole percent primary hydroxyl groups based on the total moles of hydroxyl groups in the polyol.

4. An elastomeric polyurethane produced by reacting: (I) a polyol as claimed in claim 3 and (II) an organic polyisocyanate in the presence of (III) a catalyst for the reaction of (I) and (II) to produce the polyurethane.

5. A composition as claimed in claim 1 wherein the polyol has from 93 to 97 weight percent of such polyoxyalkylene blocks and from 7 to 3 weight percent of such polyoxyethylene blocks based on the total weight of such blocks in the polyol.

6. A composition as claimed in claim 1 wherein the polyol has an average of from 3.8 to 4.8 hydroxyl groups per molecule.

7. A composition as claimed in claim 1 wherein the polyol has a hydroxyl number from 25 to 35.

8. A composition as claimed in claim 1 wherein the polyol has at least 50 mole-% primary hydroxyl groups based on the total moles of hydroxyl groups in the polyol.

9. An elastomeric polyurethane as claimed in claim 2 wherein said reaction is conducted in the presence of (IV) a blowing agent and (V) a silicone surfactant to form a foam.

10. An elastomeric polyurethane as claimed in claim 4 wherein said reaction is conducted in the presence of (IV) a blowing agent and (V) a silicone surfactant to form a foam.

11. A polymer/polyol composition as claimed in claim 1 wherein the oxyalkylene groups containing at least 3 carbon atoms in the polyol are oxypropylene groups.

12. An elastomeric polyurethane as claimed in claim 2 wherein the oxyalkylene groups containing at least 3 carbon atoms in the polyol are oxypropylene groups.

13. A normally liquid polyoxyalkylene-polyoxyethylene polyol as claimed in claim 3 wherein the oxyalkylene groups containing at least 3 carbon atoms in the polyol are oxypropylene groups.

* * * * *

UNITED STATES PATENT AND TRADEMARK OFFICE
CERTIFICATE OF CORRECTION

PATENT NO. : 4,111,865
DATED : September 5, 1978
INVENTOR(S) : C.G. Seefried, Jr. et al.

It is certified that error appears in the above-identified patent and that said Letters Patent are hereby corrected as shown below:

In the Title, for "FORMS" read --FOAMS--.

Column 4, line 23, for "ude" read --use--.

Column 4, line 35, for "fulfide" read --sulfide--.

Column 5, line 26, for "trans-decalin" read --trans-Decalin--.

Column 15, line 17, for "7.w." read --m.w.--.

Column 18, line 42, for "polyol" read --Polyol--.

In Table I, at the bottom of columns 19 and 20, the portion which reads

| | | | | | |
|---|---|---|---|---|---|
| Cookout time, hours | 3 | 3 | 4.5 | 6.4 | 4 |
| Potassium hydroxide, grams | 80 | | 67 | | |
| Temperature, °C | 140 | | 140 | | |
| Pressure, mm Hg | 760 | | 760 | | |

should read

UNITED STATES PATENT AND TRADEMARK OFFICE
CERTIFICATE OF CORRECTION

PATENT NO. : 4,111,865

DATED : September 5, 1978

INVENTOR(S) : C. G. Seefried, Jr. et al.

It is certified that error appears in the above-identified patent and that said Letters Patent are hereby corrected as shown below:

| | | | | | |
|---|---|---|---|---|---|
| Cookout time, hours | 3 | 3 | 4.5 | 6.4 | 4 |
| Potassium hydroxide, grams | 80 | | 67 | | |
| Temperature, °C | 140 | | 140 | | |
| Pressure, mm Hg | 760 | | 760 | | |
| Time, hours | 1 | | 1.5 | | |

In Table I, at the top of column 21, delete the horizontal line "Time, hours 1 1.5" and in footnote (1) for "L" read --B--.

In Table IV, columns 23-24, near the bottom for the portion which reads

| | | | | |
|---|---|---|---|---|
| Monomer + VAZO Feed Rate, bm/hr | 2767 | 2741 | 2762 | 2782 |
| total, gm | 15,085 | 10,401 | 7995 | 9736 |

should read

| | | | | |
|---|---|---|---|---|
| Monomer + VAZO Feed Rate, gm/hr | 641 | 646 | 648 | 643 |

UNITED STATES PATENT AND TRADEMARK OFFICE

CERTIFICATE OF CORRECTION

PATENT NO. : 4,111,865

DATED : September 5, 1978

INVENTOR(S) : C.G. Seefried, Jr. et al

It is certified that error appears in the above-identified patent and that said Letters Patent are hereby corrected as shown below:

| | | | | |
|---|---|---|---|---|
| Product Weight,gm/hr | 2767 | 2741 | 2762 | 2782 |
| total,gm | 15,085 | 10401 | 7955 | 9736 |

In Table VI, column 25, near the bottom, delete the footnotes.

In column 26, line 1, for "IV" read --VI--.

In Table XIV, column 36 near the top, in the fourth entry in Table column 16, for "0.00011" read --0.00017--.

In Table XVII, column 37 near the middle, the word "Measured" which is near Table column 15 should be directly beneath the word "Calculated".

In Table XIX, column 38 near the middle, there should be an asterisk (*) before the word "Target" which appears at the end of the Table.

In Table XXII, between columns 41 and 42, near the top, in footnote (a) for "6" read --5--.

UNITED STATES PATENT AND TRADEMARK OFFICE

CERTIFICATE OF CORRECTION

PATENT NO. : 4,111,865

DATED : September 5, 1978

INVENTOR(S) : C.G. Seefried, Jr. et al.

It is certified that error appears in the above-identified patent and that said Letters Patent are hereby corrected as shown below:

In Table XXVI, between columns 43 and 44 near the bottom, to the right of "Remarks" (1) the remark "No Shrinkage" applies to Table column 27 as well as to, as indicated, Table column 26 and (2) the word "Bad", printed in Table column 27, should be read in Table column 29 between "Very" and "Shrink".

In Table XXVII, column 46 near the bottom, in Table column 37, penultimate entry, for "3.03" read --3.08--.

UNITED STATES PATENT AND TRADEMARK OFFICE

CERTIFICATE OF CORRECTION

PATENT NO. : 4,111,865

DATED : September 5, 1978

INVENTOR(S) : C. G. Seefried, Jr. et al.

It is certified that error appears in the above-identified patent and that said Letters Patent are hereby corrected as shown below:

In Table XXVIII, between column 47 and 48, middle, to the right of "TEOA", in Table columns 39,40, and 41, read the numbers --1--, --2--, and --4--, respectively, and read to the right of "Isocyanate I" the entry "105 Index" as applying to all of the Table columns including Table column 41, and the portion of the Table which reads Resiliency,
Resiliency, ball rebound

25% should read

Resiliency % ball rebound

ILD ($lbs/50\ in^2$)

25%

Signed and Sealed this

*Twenty-eighth* Day of *August 1979*

[SEAL]

*Attest:*

LUTRELLE F. PARKER

*Attesting Officer* *Acting Commissioner of Patents and Trademarks*

UNITED STATES PATENT AND TRADEMARK OFFICE
CERTIFICATE OF CORRECTION

PATENT NO. : 4,111,865
DATED : September 5, 1978
INVENTOR(S) : Seefried et al.

It is certified that error appears in the above-identified patent and that said Letters Patent are hereby corrected as shown below:

In Table IV, columns 23-24, middle, first entry in Table column 3, for "2.9" read --2.99--.

Signed and Sealed this

***First* Day of *July 1980***

[SEAL]

*Attest:*

SIDNEY A. DIAMOND

*Attesting Officer* *Commissioner of Patents and Trademarks*